United States Patent
Peng et al.

(10) Patent No.: US 10,887,060 B2
(45) Date of Patent: Jan. 5, 2021

(54) ELECTRONIC DEVICE AND COMMUNICATION METHOD IN A WIRELESS COMMUNICATION SYSTEM

(71) Applicant: Sony Corporation, Tokyo (JP)

(72) Inventors: Jianjun Peng, Beijing (CN); Bo Bai, Beijing (CN); Wei Chen, Beijing (CN); Xin Guo, Beijing (CN); Shuai Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/089,558

(22) PCT Filed: Jul. 14, 2016

(86) PCT No.: PCT/CN2016/089980
§ 371 (c)(1),
(2) Date: Sep. 28, 2018

(87) PCT Pub. No.: WO2017/166538
PCT Pub. Date: Oct. 5, 2017

(65) Prior Publication Data
US 2020/0153570 A1 May 14, 2020

(30) Foreign Application Priority Data
Apr. 1, 2016 (CN) .......................... 2016 1 0203096

(51) Int. Cl.
H04L 5/00 (2006.01)
H04W 72/12 (2009.01)

(52) U.S. Cl.
CPC ............ H04L 5/0016 (2013.01); H04L 5/006 (2013.01); H04L 5/0037 (2013.01);
(Continued)

(58) Field of Classification Search
CPC ..... H04L 5/0016; H04L 5/0037; H04L 5/006; H04W 72/121; H04W 72/1231; H04W 72/1247
See application file for complete search history.

(56) References Cited

U.S. PATENT DOCUMENTS

2007/0070956 A1* 3/2007 Seki ...................... H04L 1/0026
370/335
2012/0268553 A1* 10/2012 Talukder .............. H04L 65/1093
348/14.08
(Continued)

FOREIGN PATENT DOCUMENTS

WO 2015/144094 A1 10/2015
WO 2016/044848 A1 3/2016

OTHER PUBLICATIONS

Nikopour, H. and Baligh, H., "Sparse code multiple access," 2013 IEEE 24th Annual International Symposium on Personal, Indoor, and Mobile Radio Communications (PIMRC), Sep. 8-11, 2013, pp. 326-331 (Abstract).
(Continued)

Primary Examiner — Chi Ho A Lee
Assistant Examiner — Andrew Lee
(74) Attorney, Agent, or Firm — Xsensus, LLP

(57) ABSTRACT

The present application relates to an electronic device and communication method in a wireless communication system. The device comprises a processing circuit configured to acquire user specific information of a plurality of user equipments communicating with the electronic device and set resource allocating parameters for non-orthogonal multiplex of a set of transmission resources based on the user specific information to apply to the sparse code multiple access of at least part of the user equipments. The user
(Continued)

specific information includes channel status of channels between the user equipments and the electronic device.

19 Claims, 16 Drawing Sheets

(52) U.S. Cl.
CPC ..... *H04W 72/121* (2013.01); *H04W 72/1231* (2013.01); *H04W 72/1247* (2013.01)

(56) References Cited

U.S. PATENT DOCUMENTS

| | | | | |
|---|---|---|---|---|
| 2015/0282185 | A1* | 10/2015 | Nikopour | H04L 1/0002 370/329 |
| 2015/0289238 | A1* | 10/2015 | Ji | H04B 7/0617 370/329 |
| 2016/0087594 | A1* | 3/2016 | Chabert | H03D 7/1433 330/261 |
| 2016/0087694 | A1* | 3/2016 | Vilaipornsawai | H04B 7/024 370/329 |
| 2016/0219627 | A1* | 7/2016 | Au | H04W 74/0841 |
| 2017/0034845 | A1* | 2/2017 | Liu | H04L 1/0003 |
| 2017/0257204 | A1* | 9/2017 | Shi | H04L 1/0035 |
| 2017/0289984 | A1* | 10/2017 | Baligh | H04W 72/0473 |
| 2018/0091342 | A1* | 3/2018 | Ji | H04W 72/12 |
| 2020/0067583 | A1* | 2/2020 | Shin | H04B 7/04 |

OTHER PUBLICATIONS

Taherzadeh, M. et al., "SCMA Codebook Design" 2014 IEEE 80th Vehicular Technology Conference (VTC2014-Fall), Sep. 14-17, 2014, pp. 1-5.

English-language translation of International Search Report and Written Opinion for International Application No. PCT/CN2016/089980 dated Dec. 30, 2016.

* cited by examiner $$\begin{bmatrix} 1 & 0 \\ 0 & 0 \\ 0 & 1 \\ 0 & 0 \end{bmatrix} \times \begin{bmatrix} X1 \\ X2 \end{bmatrix} = \begin{bmatrix} X1 \\ 0 \\ X2 \\ 0 \end{bmatrix}$$

Fig. 8C

|  | UE1 | UE2 | UE3 | UE4 | UEn |
|---|---|---|---|---|---|
| R1 | 1 | 0 | 0 | 1 | ... |
| R2 | 1 | 0 | 0 |  | ... |
| R3 | 1 | 0 | 0 |  | ... |
| R4 | 0 | 1 | 0 | 1 | ... |
| R5 | 0 | 1 | 0 |  | ... |
| R6 | 0 | 1 | 0 |  | ... |
| R7 | 0 | 0 | 1 |  | ... |
| R8 | 0 | 0 | 1 |  | ... |
| R9 | 0 | 0 | 1 |  | ... |
| R10 | 0 | 0 | 0 | 1 | ... |

Fig. 8D

|      | CQI | modulation scheme | modulation scheme for SCMA |
|------|-----|-------------------|----------------------------|
| UE1  | 9   | 16QAM             | QPSK                       |
| UE2  | 1   | QPSK              | QPSK                       |
| UE3  | 6   | QPSK              | QPSK                       |
| UE4  | 5   | QPSK              | QPSK                       |

Fig. 9A

|      | CQI | modulation scheme | group number | resource block |
|------|-----|-------------------|--------------|----------------|
| UE1  | 1   | QPSK              | 1            | 5、6            |
| UE2  | 9   | 16QAM             | 2            | 1~4            |
| UE3  | 7   | 16QAM             | 2            | 1~4            |
| UE4  | 8   | 16QAM             | 2            | 1~4            |

Fig. 9B

| constellations | (1)-(2) | (1)-(3) | (2)-(3) |
|---|---|---|---|
| interference distance D1 | 0.8386 | 0.8386 | 0.7891 |
| constellation order | (1)-(2)-(3)/(1)-(3)-(2)/(2)-(1)-(3)/(3)-(1)-(2) | | |
Fig. 10C
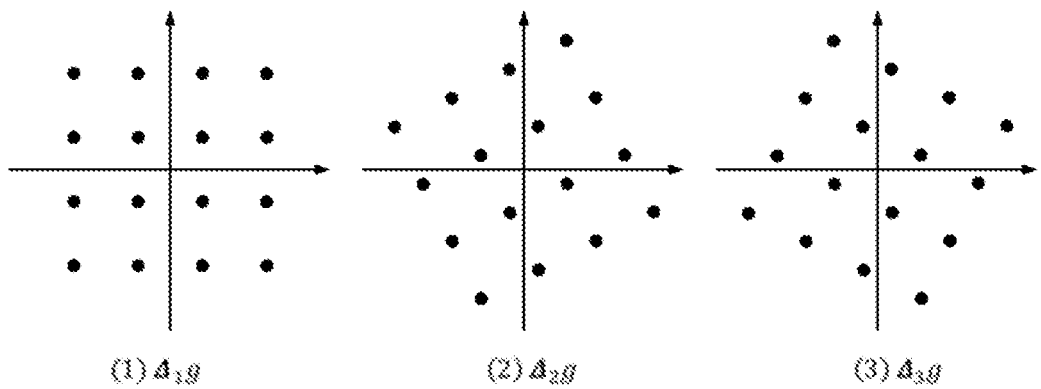
(1) $A_{1,\theta}$  (2) $A_{2,\theta}$  (3) $A_{3,\theta}$
Fig. 10D
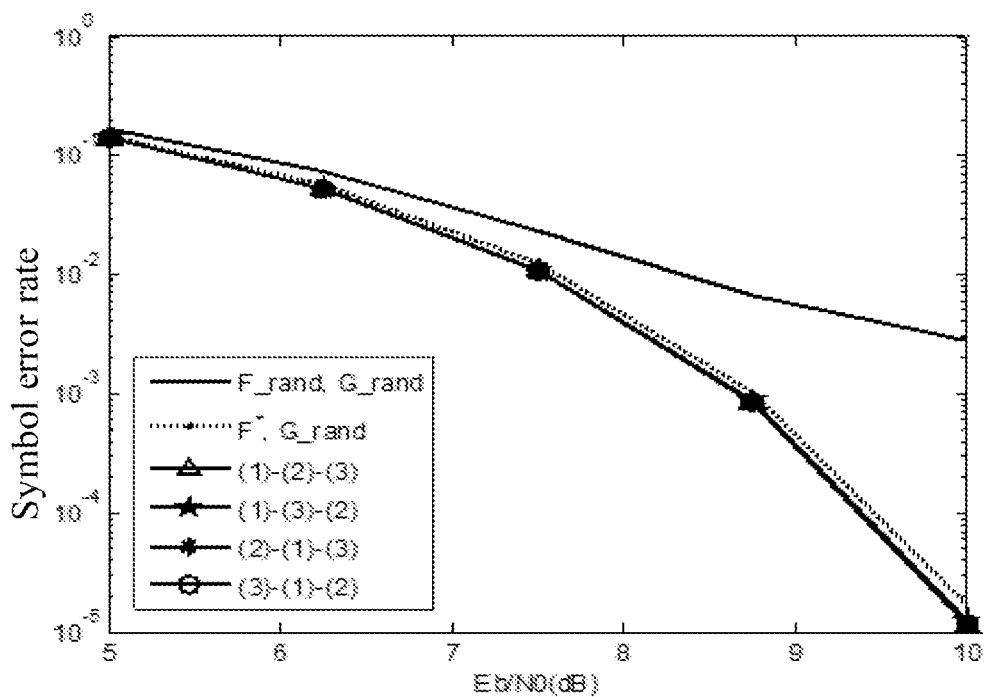
Fig. 11A

ELECTRONIC DEVICE AND COMMUNICATION METHOD IN A WIRELESS COMMUNICATION SYSTEM

TECHNICAL FIELD

The application is generally related to an electronic device and a communication method in a wireless communication system, in particular, to an electronic device and a communication method for a sparse code multiple access (SCMA).

BACKGROUND ART

The sparse code multiple access, which is a novel non-orthogonal multiple access technology, has the features of a high spectrum efficiency, a low signalling overhead, a low latency, and the like, and is considered to have a wide application prospect in the future 5G communication. In the sparse code multiple access technology, a binary symbol is mapped to be a codeword in a multi-dimensional sparse codebook directly, in order to acquire an encoded data stream, and each codebook is, for example, associated with a corresponding access user. Therefore, the codebook design is always a popular topic in the sparse code multiple access technology. In research of the codebook design, it is required that a constellation and a mapping matrix is designed for each access user differently, where the constellation is used to a procedure of modulation of a bit information to a low-dimensional constellation point, and the mapping matrix is used to a sparsity of the low-dimensional constellation point to a high-dimensional constellation point.

It is difficult to obtain an optimal design method upon the codebook design, since it is required that the codebook is designed for each access user differently, and there is no universal design standard. A solution by which the designs of the mapping matrix and the constellation are separated from each other so as to be designed individually in order to achieve the final codebook design is proposed in the papers "Sparse code multiple access," in IEEE 24th PIMRC, 2013, pp. 332-336, Hosein Nikopour and Hadi Baligh, and "SCMA Codebook Design." Vehicular Technology Conference (VTC Fall), 2014 IEEE 80th. IEEE, 2014, Taherzadeh, Mahmoud, et al. In this solution, in terms of the given system parameters, a criterion for the mapping matrix design for supporting the maximum communication users is given firstly, and then the constellation is designed individually in the solution. Also, a plurality of different constellations are obtained by designing a multi-dimensional parent constellation initially and performing thereon a series of operations such as rotation and transposition subsequently, when the constellation is designed.

There are some disadvantages in the solution. Firstly, in terms of the design of the mapping matrix, only the criterion for the mapping matrix design for supporting the maximum communication users is proposed, but a design method for the mapping matrix for a specific number of the access users has not been provided explicitly. Secondly, the designs of the mapping matrix and the constellation are independent completely from each other without consideration of utilization of the information on the existing mapping matrix upon the design of the constellation in the solution. Thirdly, the solution is merely a cellular parameter-based system design method without consideration of the differences in the user ends.

SUMMARY OF THE INVENTION

An object of the present application is to propose an electronic device and a communication method in which the designs of a mapping matrix and a constellation are optimized so as to overcome at least one of the above-described disadvantages.

An aspect of the present application is related to an electronic device on a side of a control device in a wireless communication system, characterized in that, it comprises a processing circuit configured to acquire a user specific information of a plurality of user equipments communicating with the electronic device, wherein the user specific information includes one or more channel statuses of individual channels between the plurality of user equipments and the electronic device; and set one or more resource allocating parameters used for a non-orthogonal multiplex of a set of transmission resources based on the user specific information to apply to a sparse code multiple access of at least one part of the plurality of user equipments.

Another aspect of the present application is related to an electronic device on a side of a user equipment in a wireless communication system, characterized in that, it comprises a processing circuit configured to provide a user specific information of the user equipment to a control device, wherein the user specific information includes a channel status of a channel between the user equipment and the control device; acquire one or more resource allocating parameters used for a non-orthogonal multiplex of a set of transmission resources by the user equipment and other user equipments from the control device to apply to a sparse code multiple access of the user equipment, wherein the one or more resource allocating parameters are set based on the user specific information of the user equipment and the other user equipments.

Yet another aspect of the present application is related to an electronic device on a side of a control device in a wireless communication system, characterized in that, it comprises an acquiring unit configured to acquire a user specific information of a plurality of user equipments communicating with the electronic device, wherein the user specific information includes one or more channel statuses of individual channels between the plurality of user equipments and the electronic device; and a setting unit configured to set one or more resource allocating parameters used for a non-orthogonal multiplex of a set of transmission resources based on the user specific information to apply to a sparse code multiple access of at least one part of the plurality of user equipments.

Still another aspect of the present application is related to an electronic device on a side of a user equipment in a wireless communication system, characterized in that, it comprises a providing unit configured to provide a user specific information of the user equipment to a control device, wherein the user specific information includes a channel status of a channel between the user equipment and the control device; an acquiring unit configured to acquire one or more resource allocating parameters used for a non-orthogonal multiplex of a set of transmission resources by the user equipment and other user equipments from the control device to apply to a sparse code multiple access of the user equipment, wherein the one or more resource allocating parameters are set based on the user specific information of the user equipment and the other user equipments.

Still yet another aspect of the present application is related to a wireless communication method used in a wireless communication system comprising at least a control device and a plurality of user equipments, characterized in that, it comprises acquiring, by the control device, a user specific information of the plurality of user equipments communicating with the control device, wherein the user specific information includes one or more channel statuses of individual channels between the plurality of user equipments and the control device; and setting, by the control device, one or more resource allocating parameters used for non-orthogonal multiplex of a set of transmission resources based on the user specific information to apply to a sparse code multiple access of at least one part of the plurality of user equipments.

Still yet another aspect of the present application is related to a wireless communication method used in a wireless communication system comprising at least a control device and a plurality of user equipments, characterized in that, it comprises providing, by the plurality of user equipments, one or more pieces of user specific information of individual user equipments to the control device, wherein, the user specific information includes a channel status of a channel between a respective user equipment and the control device; acquiring, by the plurality of user equipments, one or more resource allocating parameters used for non-orthogonal multiplex of a set of transmission resources by the respective user equipment from the control device to apply to a sparse code multiple access of the plurality of user equipments, wherein the one or more resource allocating parameters are set based on the one or more pieces of user specific information of the plurality of user equipments.

Therefore, in accordance with aspects of the present application, a novel design method for designing a mapping matrix or a factor graph matrix in terms of a specific number of the user equipments in accordance with one or more pieces user specific information, in particular, one or more channel statuses, is proposed, which can improve the design scheme of the codebook of the SCMA with respect to a common criterion of the prior art, such that the SCMA is adapted to be applied in the practical communication system, and the performance of bit error rate is improved.

BRIEF DESCRIPTION OF THE DRAWINGS

The above and other objects and advantages of the present application are further described in conjunction with specific embodiments with reference to the accompany drawings. Like or corresponding technical features or components will be represented by employing like or corresponding reference numerals in the drawings.

FIG. 8C is a schematic diagram of a procedure for mapping a modulation symbol with the mapping matrix; and FIG. 8D is an exemplary schematic diagram for constructing the factor graph matrix of the mapping matrix;

FIGS. 9A to 9B illustrate a variant embodiment for setting one or more resource allocating parameters;

FIG. 10C is a diagram of a result of constellation allocation; and FIG. 10D is a schematic diagram of a variant embodiment of the constellation allocation;

DESCRIPTION OF EMBODIMENTS

Figure 1:
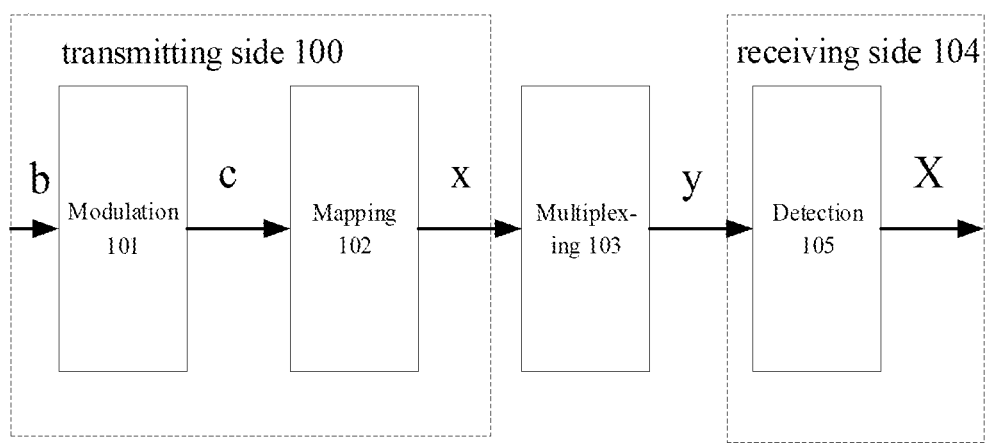
FIG. 1 illustrates a block diagram of a sparse code multiple access system in accordance with an embodiment of the present application.

The demonstrative embodiments of the present application will be described in conjunction with the drawings hereinafter. Not all features of the embodiments are described in the specification for the purpose of clarity and simplicity. It will be appreciated, however, that many implementation-specific settings have to be made during implementing the embodiments, such that the concrete objectives of the developers are achieved, for example, to be compliant with those limitations associated with the devices and the services, and such limitations could be varied due to the difference from implementations to implementations. In addition, it will be appreciated that the development effort is merely a routine task for a person skilled in the art with benefit from the disclosed subject matter, although it might be quite complicated and time-consuming.

It is to be noted herein that only the process steps and/or the device structures closely associated with the at least schemes in accordance with the present application are illustrated in the drawings, and other details not much associated with the present application are omitted, in order to avoid that the present application is obscured by unnecessary details.

Next, a description is made in the order as follows.

1. A SCHEMATIC CONFIGURATION OF A SPARSE CODE MULTIPLE ACCESS SYSTEM IN ACCORDANCE WITH AN EMBODIMENT OF THE PRESENT APPLICATION

FIG. 1 illustrates a block diagram of the sparse code multiple access system in accordance with the embodiment of the present application. The entire system may be divided into four modules, i.e., a modulating module 101, a mapping module 102, a multiplexing module 103, and a detecting module 104, from a transmitting side to a receiving side. A bit information $b \in \mathbb{B}^{log_2 M}$ transmitted from a device on a transmitting side such as a user equipment or a base station is modulated by a N-dimensional constellation to obtain an N-dimensional symbol $c \in \mathbb{C}^N$ in the modulating module 101, where M is a number of points in the constellation. The symbol c is mapped by using a mapping matrix V to obtain a sparse K-dimensional codeword $x \in \mathbb{C}^K$ (N<K) in the mapping module 102. The codewords of a plurality, e.g., J, of user equipments are concatenated in the multiplexing module 103, before being transmitted to the base station or from the base station to the user equipments over a wireless channel. A multi-user detection may be implemented in the detecting module 105, that is, the signals of the plurality of users, $X=(x_1, \ldots, x_J)$ are detected, by employing a Message Passage Algorithm (MPA) with lower complexity by utilization of the sparsity of the transmitted signals in accordance with a channel status information CSI after a signal y is received by a device on the receiving side, such as the base station or the user equipments. An optimized codebook design of the SCMA is achieved substantially based on the modulating module and the mapping module in the present application, as described hereinafter.

Figure 2:
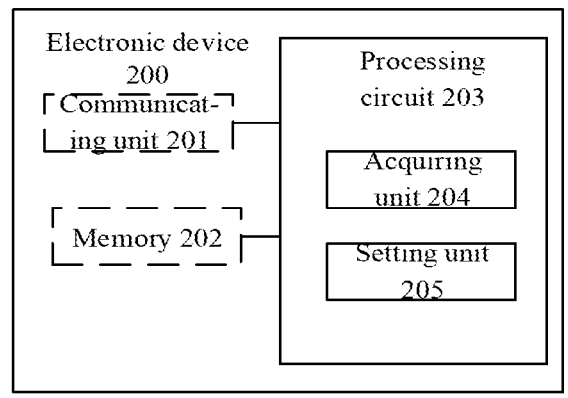
FIG. 2 illustrates a block diagram of an electronic device on a side of a control device in accordance with an embodiment of the present application.

1-1. A Schematic Configuration of an Electronic Device 200 on the Side of the Control Device FIG. 2 illustrates a block diagram of the electronic device such as the base station on the side of the control device in accordance with an embodiment of the present application.

The electronic device 200 such as the base station on the side of the control device in accordance with one embodiment of present disclosure may comprise, for example, a communicating unit 201, a memory 202, and a processing circuit 203.

The processing circuit 203 of the electronic device 200 provides various functions of the electronic device 200. For example, the processing circuit 203 of the electronic device 200 may comprise an acquiring unit 204 and a setting unit 205. The acquiring unit 204 may be configured to acquire one or more pieces of user specific information on a plurality of electronic devices 300 on the side of the user equipment, in communication with the electronic device 200, as described below. The user specific information may comprise a channel status of a communication channel between the electronic devices 300 and 200, e.g., a channel direction which, for example, may be represented by a Precoded Matrix Index PMI, a channel quality which, for example, may be represented by a quantized Channel Quality Information CQI. There are different manners available for acquiring the channel status of the communication channel between the electronic devices 300 and 200, depending on symmetry of a forward and backward channels of a communication system. In an example where the forward and backward channels are asymmetric, the acquiring unit 204 may acquire the user specific information including the channel status from the electronic device 200 to the electronic device 300 in accordance with the information fed back after measuring by the electronic device 300, a reference signal transmitted by the electronic device 200. Alternatively, the electronic device 300 will also transfer a Sounding Reference Signal SRS for measurement by the electronic device 200, such that the channel status from the electronic device 200 to the electronic device 300 is acquired by the acquiring unit 204. In some examples, the mapping matrix and the constellation are determined by the electronic device 200 in accordance with the channel quality. In other examples, the electronic device 200 acquires the channel directions of the plurality of user equipments for determination of the interferences therebetween, and combines the user equipments with larger differences in the channel directions together to be SCMA encoded.

The user specific information is not limited to the channel status merely, and may also comprise at least one of a priority and a service type of the user equipment. In the case where the user priority is included, the user priority is decided by the electronic device 200, and the communication quality of the user with a higher priority is guaranteed sufficiently by, for example, a conventional OFDMA, but only the user with a lower priority is subject to the SCMA process, such that an efficient utilization of resources is achieved. In addition, in the case where the service type of the user equipment is included, the present application may be used in conjunction with a subcarrier with an adjustable bandwidth/flexible symbol length setting, for example, an F-OFDM technology, such that the user equipments for which the service types are coincident with each other are combined together to be SCMA encoded in consideration of the service types such as a narrowband subcarrier for an Internet of Things (IoT) traffic and a wideband subcarrier for a real-time Internet of Vehicles traffic.

The setting unit 205 may be configured to set one or more resource allocating parameters used for non-orthogonal multiplex of a set of transmission resources based on the user specific information, to apply to the sparse code multiple access of at least one part of the plurality of user equipments. The set of transmission resources may be a set of the various levels/types of resources for the communication transmission, for example, a set of slots, frequency bands, subcarriers, time-frequency resource units, or time-frequency resource blocks, depending on a specifically applied granularity of the resource allocation of the communication system. The resource allocating parameters indicate the resource of the set of transmission resources occupied by the user equipment, and is, for example, a mapping matrix or a variant thereof, such as a binary indicator vector, or a factor graph matrix containing a plurality pieces of information on the user mapping matrix, etc., which will be described in detail hereinafter.

The communicating unit 201, for example, embodied as a transceiver, of the electronic device 200 may be configured to perform communication with individual electronic devices 300 under the control of the processing circuit 203.

In the embodiments of the present application, the communicating unit 201 may, for example, be implemented as a communication interface component such as an antenna device, a radio frequency circuit, and a baseband processor, etc. The communicating unit 201 is plotted by a dotted line, since it may also be located inside the processing circuit 203 or outside the electronic device 200.

The memory 202 may store information generated by the processing circuit 203, information received by the communicating unit 201 from the individual electronic devices 300, programs and datam for operation of the electronic device 200, and the resource allocating parameters as described above. The memory 202 is plotted by a dotted line, since it may also be located inside of the processing circuit 203 or outside of the electronic device 200. The memory 202 may be a volatile memory and/or a non-volatile memory. For example, the memory 202 may include, but not limited to, the Random Access Memory (RAM), the Dynamic Random Access Memory (DRAM), the Static Random Access Memory (SRAM), the Read-Only Memory (ROM), and the flash memory.

Figure 3:
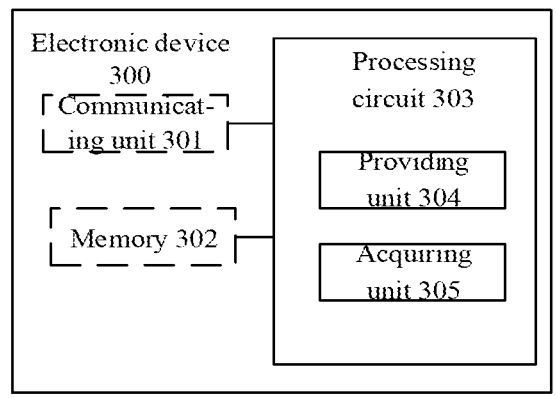
FIG. 3 illustrates a block diagram of an electronic device on a side of a user equipment in accordance with an embodiment of the present application.

1-2. A Schematic Configuration of the Electronic Device 300 on the Side of the User Equipment FIG. 3 illustrates a block diagram of the electronic device 300 such as a smartphone on the side of the user equipment in accordance with an embodiment of the present application.

The electronic device 300 in accordance with one embodiment of the present application may comprise, for example, a communicating unit 301, a memory 302, and a processing circuit 303.

The processing circuit 303 of the electronic device 300 provides various functions of such device. For example, the processing circuit 303 of the electronic device 300 may comprise a providing unit 304 and an acquiring unit 305 in the embodiment of the present application. The providing unit 304 may be configured to provide the user specific information on the user equipment, where the user specific information includes channel status of a channel between the user equipment and the control device. The user specific information is not limited to the channel status, and may also comprise at least one of the priority and the service type of the user equipment, as described above. The acquiring unit 305 may be configured to acquire, from the electronic device 200 on the side of the control device, the one or more resource allocating parameters used for non-orthogonal multiplex of the set of transmission resources by that and other electronic devices 300 to apply to the sparse code multiple access of that electronic device 300.

The communicating unit 301 of the electronic device 300 may be configured to perform the communication with the individual electronic devices 200 as described above under the control of the processing circuit 303. The communicating unit 301 is plotted by a dotted line, since it may also be located inside the processing circuit 303 or outside the electronic device 300.

The memory 302 may store information generated by the processing circuit 303, information received by the communicating unit 301 from the electronic device 200, programs and datum for the operation of the electronic device 300, and the one or more resource allocating parameters. The memory 302 is plotted by a dotted line, since it may also be located inside the processing circuit 303 or outside the electronic device 300. The memory 302 may be a volatile memory and/or a non-volatile memory. For example, the memory 302 may include, but not limited to, the Random Access Memory (RAM), the Dynamic Random Access Memory (DRAM), the Static Random Access Memory (SRAM), the Read-Only Memory (ROM), and the flash memory.

The above-described individual units are the exemplary and/or preferred modules for embodying the processes depicted in the present application. Those modules may be the hardware units, such as the Central Processor Unit, the Field Programmable Gate Array, the Digital Signal Processor, or the Application Specific Integrated Circuit, and the like, and/or the software modules, such as a computer readable program. The modules for embodying the individual steps as described hereinafter are not depicted exhaustively as above. There may be, however, the corresponding modules or units (embodied by the hardware and/or the software) for embodying a process, as long as there is a step for performing the same process. The technical schemes defined by all of the combinations of the steps as described hereinafter and the units corresponding thereto are all comprised in the disclosed subject matter of the present application, as long as those technical schemes constructed thereby is complete and applicable.

Moreover, the devices consisted of a variety of units may be integrated into a hardware device such as a computer as the functional modules. The computer may, of course, have other hardware or software components, in addition to those functional modules.

2. A COMMUNICATION PROCEDURE IN ACCORDANCE WITH AN EMBODIMENT OF THE PRESENT APPLICATION

Figure 4:
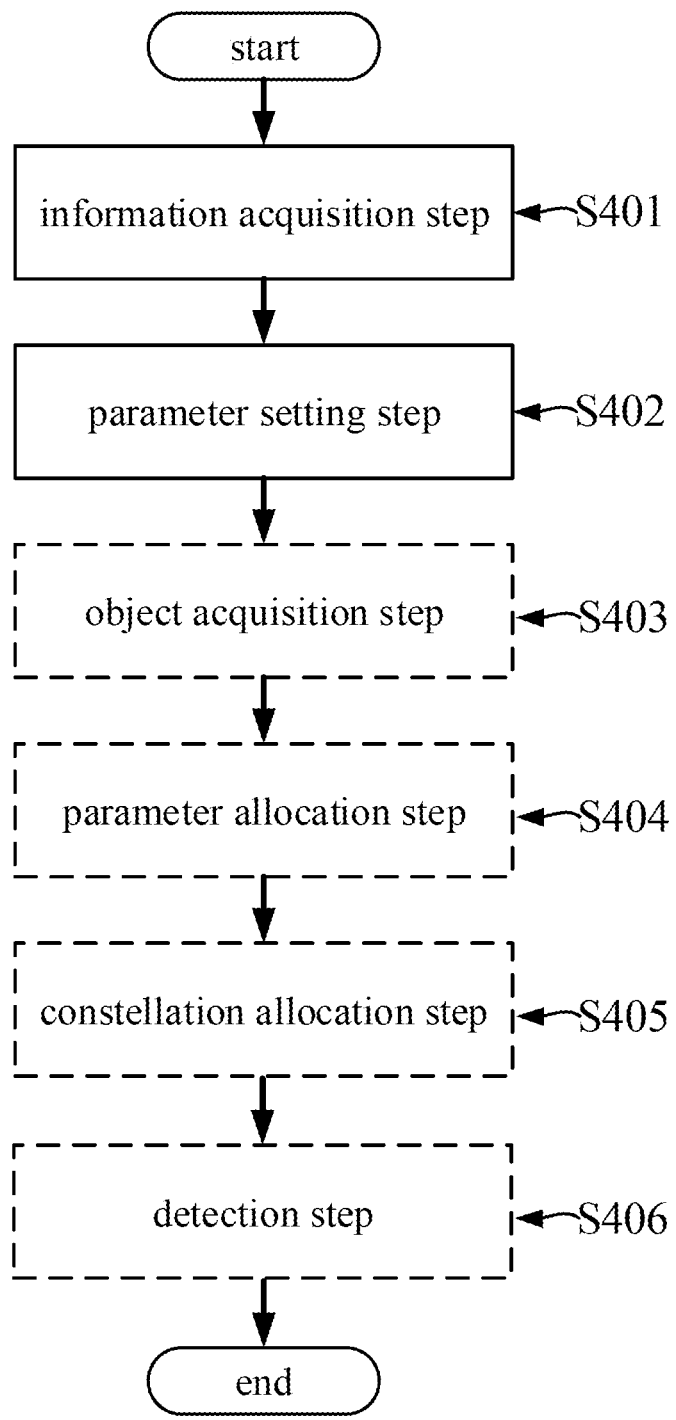
FIG. 4 is an overall flow of a communication method in accordance with an embodiment of the present application.

2-1. FIG. 4 is an Overall Flow of a Communication Method in Accordance with the Embodiment of the Present Application In the case where a change in the user equipment participating in SCMA, for example, a new addition of SCMA, an exit of SCMA, or a change in the priority, occurs, execution of the flow in FIG. 4 may be triggered to be started.

The electronic device 200 on the side of control device may acquire one or more pieces of user specific information on the plurality of electronic devices 300 on the side of the user equipment communicating with the electronic device 200 in step S401. The user specific information includes channel status of the channel between the electronic devices 300 and 200. The user specific information is not limited to the channel status and may also include at least one of the priority and the service type of the user equipment, as described above.

After the channel status such as the CQI is acquired, a modulation manner used for the user equipment may be determined in accordance with a correspondence of the CQI to the modulation manner, as described in detail with reference to FIGS. 8A to 8B hereinafter.

An uplink herein is referred to be a direction in which the signal is transmitted from the electronic device 300 to the electronic device 200, and a downlink is referred to be a direction opposite to that of the uplink. In one example, the CQI of an uplink channel is acquired by measuring an uplink reference signal transmitted by the electronic device 300 to the electronic device 200. In practice, the user specific information may be acquired by the electronic device 200, in either case of the uplink or the downlink communication, which will be illustrated in detail in conjunction with the schematic diagrams in FIGS. 5 to 7 hereinafter. In another example, the channel status may be estimated directly in accordance with a location relationship of the electronic device 300 relative to the electronic device 200, instead of measurement. For example, the channel quality is deemed to be poor if a distance therebetween is larger. Alternatively, the channel quality is deemed to be poor if there is a big obstacle such as a mountain or a tunnel, etc. therebetween.

The electronic device 200 may set the one or more resource allocating parameters used for non-orthogonal multiplex of the set of transmission resources based on the user specific information, to apply to the sparse code multiple access of the at least one part of the plurality of electronic devices 300 in step S402. The resource allocating parameter indicates the resource of the set of transmission resources occupied by the user equipment, where the number of the resource occupied by the user equipment is associated with the channel status. The resource allocating parameters are, for example, a mapping matrix or a variant thereof, such as a binary indicator vector, or a factor graph matrix containing a plurality pieces of information on the user mapping matrix. That step will be described in detail with reference to FIGS. 8A to 8D hereinafter as an important portion of the present application.

The electronic device 200 may acquire an optimization target for optimizing SCMA in step S403, the optimization target including at least one of the priority of the electronic device 300 and overall performance requirement of the system. The priority may be provided by the electronic device 300 and is determined based on at least one of a buffer report, QoS, or a charge level of the electronic device 300.

That step is optional since the subsequent steps in the communication flow may also be performed without consideration of the optimization target.

The electronic device 200 preferably allocates one mapping matrix or binary indicator vector to each electronic device 300 in accordance with at least one optimization target and with an interference or overlap condition between individual binary indicator vectors of the plurality of mapping matrices in step S404. The binary indicator vector indicates the resource of the set of transmission resources occupied by the electronic device 300, as described above. In that step, a consideration of the optimization target, for example, the priority of the electronic device 300 enables optimization of occupancy of the available resource of the set of transmission resources by the electronic devices 300 with different priorities, such that the Quality of Service is improved. Alternatively, a consideration of the optimization target, for example, the overall performance requirement of the system, enables optimization of occupancy of the available resource of the set of transmission resources by the different electronic devices 300, such that the best overall performance requirement such as bit error rate or decoding probability, etc., is obtained. Alternatively, one binary indicator vector may be allocated randomly to each electronic device 300 merely in accordance with the interference or overlap condition without consideration of the optimization target.

The electronic device 200 preferably allocates the respective constellations to the individual electronic devices 300 in accordance with at least one optimization target and the interference condition among a plurality of constellations determined based on the modulation scheme, or considers the design and allocation of the constellation from another perspective (a signal stratum) in step S405. The plurality of constellations may be obtained by employing one parent constellation and a plurality of different operations of rotation thereon, as illustrated in FIGS. 10B and 10D. In that step, the consideration of the optimization target, for example, the priority of the electronic device 300 enables optimization of the occupancy of the available resource of the set of transmission resources by the electronic devices with different priorities, such that the Quality of Service is improved. Alternatively, consideration of the optimization target, for example, the overall performance requirement of the system, enables optimization of the occupancy of the available resource of the set of transmission resources by the different electronic devices 300, such that the best overall performance requirement such as bit error rate or encoding probability, etc., is obtained. Alternatively, one of the plurality of constellations is randomly allocated to each electronic device 300 merely in accordance with the interference condition without consideration of the optimization target.

The step will be described in detail with reference to FIGS. 10A to 10D hereinafter as another important portion of the present application.

The respective binary data is detected on a multiplexed resource in accordance with a Message Passage Algorithm (MPA) by utilizing sparsity of the transmitted signals at a receiving end such as the base station upon the uplink communication or the user equipment upon the downlink communication in step S406. The pieces of information on the resource allocation and the constellation of all of the users are required to be used by the receiving end to perform a multi-user detection and decoding during that procedure. The description of the detection and decoding is omitted herein, as the procedures thereof are known technology.

Figure 5:
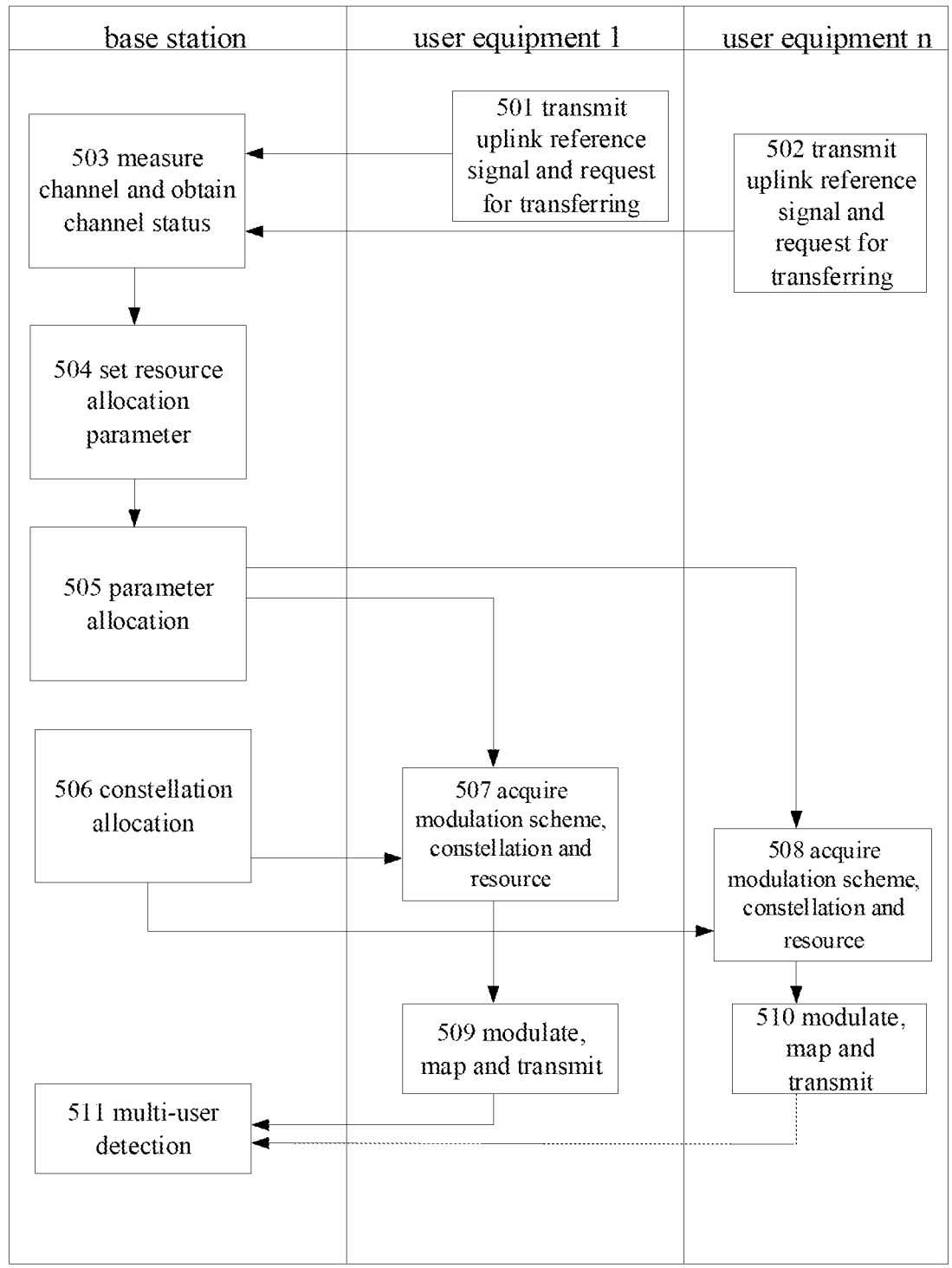
FIG. 5 is a schematic diagram of an uplink communication method in accordance with an embodiment of the present application.

2-2. A Schematic Diagram of the Communication Procedure in Accordance with the Embodiment of the Present Invention The schematic diagram of the communication procedure in accordance with the embodiment of the present invention is described in detail with reference to FIGS. 5 to 7 as below, which illustrate specifically a variety of communication scenarios in which the present invention is applicable to the uplink and the downlink. FIG. 5 is the schematic diagram of the uplink communication method which may be adapted to TDD uplink communication or FDD uplink communication between the base station and the user equipment in accordance with the embodiment of the present application, the TDD and FDD being only examples herein rather than limitations on the present disclosure.

Blocks 501 to 503 correspond to step S401 in the flowchart in FIG. 4. The user equipment 1 transmits an uplink reference signal and a request for transfer to the base station in block 501. Similarly, the user equipment n transmits an uplink reference signal and a request for transfer to the base station in block 502. The base station measures the uplink reference signal to acquire the channel statuses of individual uplink channels in block 503. The base station may also calculate the number of the user equipments requesting SCMA by transferring a request.

The one or more resource allocating parameters used for non-orthogonal multiplex of the set of transmission resources are set in accordance with the channel statuses to apply to the sparse code multiple access of the user equipments 1 to n in block 504, which corresponds to step S402 in the flowchart in FIG. 4 as described in detail below.

Block 505 corresponds to step S404 in the flowchart in FIG. 4, in which one mapping matrix or binary indicator vector is allocated to each user equipment in accordance with at least the interference or overlap scenario among the individual binary indicator vectors of the plurality of mapping matrices, such that the user equipment knows the resource of the set of time-frequency resources occupied by itself. Moreover, since after the channel statuses such as CQIs are acquired in block 503, the modulation schemes used for the user equipments may be determined in accordance with the correspondence of the CQIs to the modulation schemes, the respective modulation schemes are also transmitted to the user equipments 1 to n in block 505.

Block 506 corresponds to step S405 in the flowchart in FIG. 4, in which the constellations are allocated to the user equipments 1 to n in accordance with the interference condition among the plurality of constellations determined based on the modulation schemes.

Preferably, the allocation may also be performed in consideration of the optimization target in blocks 505 and 506, as described in steps S404 and S405 in FIG. 4, and the description thereof is omitted herein.

The user equipments 1 to n may perform modulations and mappings on the binary codes stream after obtaining the modulation schemes, the constellations, and the allocated resources in blocks 507 and 508, such that the uplink transmission procedure is completed, as illustrated in blocks 509 and 510.

Block 511 corresponds to the detection step S406 in the flowchart in FIG. 4. The base station utilizes the sparsity of the transmitted signals, enabling detection of the respective data of the user equipments on the multiplexed time-frequency resources in accordance with the Message Passage Algorithm (MPA). Specifically, the base station creates a factor graph model in accordance with the mapping matrices of the individual user equipments 1 to n after receiving the multiplexed signals, each user equipment being one variable node and each resource block being one factor node, where an edge existed between the variable and factor nodes represents that such resource block is occupied by that user equipment. Then a possible value taken by each variable node, i.e., a constellation point symbol that may be transmitted by that user equipment, and a probability of each value (the initial values may be set to be equiprobability) are determined in accordance with the constellation of each user equipment. A plurality of iterations are performed in each of which a variable node transmits a priori probability of a possible value taken thereby to each factor node connected therewith, and the factor node calculates a posterior probability in accordance with the received signal after gathering a message transmitted by the variable node and transmits to the variable node. A convergence condition of the iterations is that a certain number of iterations is reached or a difference between the transmitted messages during two iterations is less than a set threshold. The constellation point symbol transmitted by each user equipment may be demodulated after the convergence. The data transmitted by the individual user equipments 1 to n is then demodulated in accordance with the constellations thereof.

Figure 6:
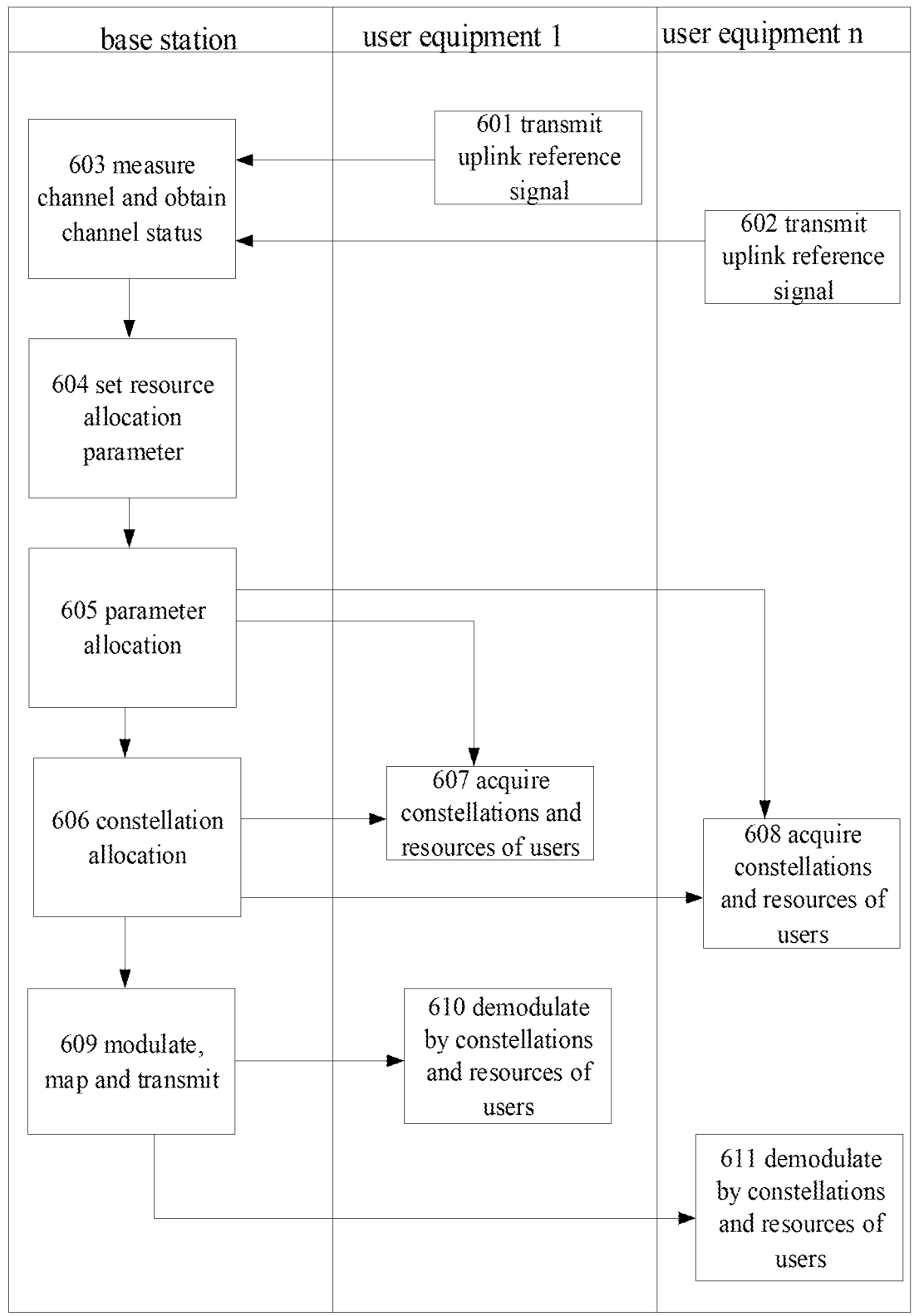
FIG. 6 is a schematic diagram of a Time Division Duplex (TDD) downlink communication method in accordance with an embodiment of the present application.

FIG. 6 is the schematic diagram of TDD downlink communication method between the base station and the user equipment in accordance with the embodiment of the present application. TDD is also an example merely herein, and not any limitation on the invention.

Blocks 601 to 606 are similar to blocks 501 to 506 in FIG. 4, and the description thereof is omitted accordingly. The difference between FIG. 6 and FIG. 5 lies in blocks 607-611, as the encoded data stream is transmitted from the base station to the user equipment and is demodulated and detected by the user equipments in the downlink communication. In particular, it is required that the constellations of all the user equipments participating in the SCMA and the resources allocated thereto are acquired for detection of the encoded data stream by the user equipments in blocks 607 and 608. The binary codes stream is modulated and mapped by the base station after the constellations of all the user equipments participating in the SCMA and the resources allocated thereto are transmitted to each user equipment in the block 609, such that the procedure of the downlink transmission is completed.

Blocks 610 and 611 correspond to step S406 in the flowchart in FIG. 4. The user equipments 1 to n detect data of the respective user equipments on the multiplexed time-frequency resource in accordance with the Message Passage Algorithm (MPA) by utilization of the sparsity of the transmitted signals. The procedure of the detection is similar to that in the uplink communication method, that is, the mapping matrices and the pieces of information on the constellations of all the user equipments 1 to n are required as well, such that the constellation symbol thereof is solved by using the Message Passage Algorithm firstly, and then the data is demodulated by using the constellation thereof.

Figure 7:
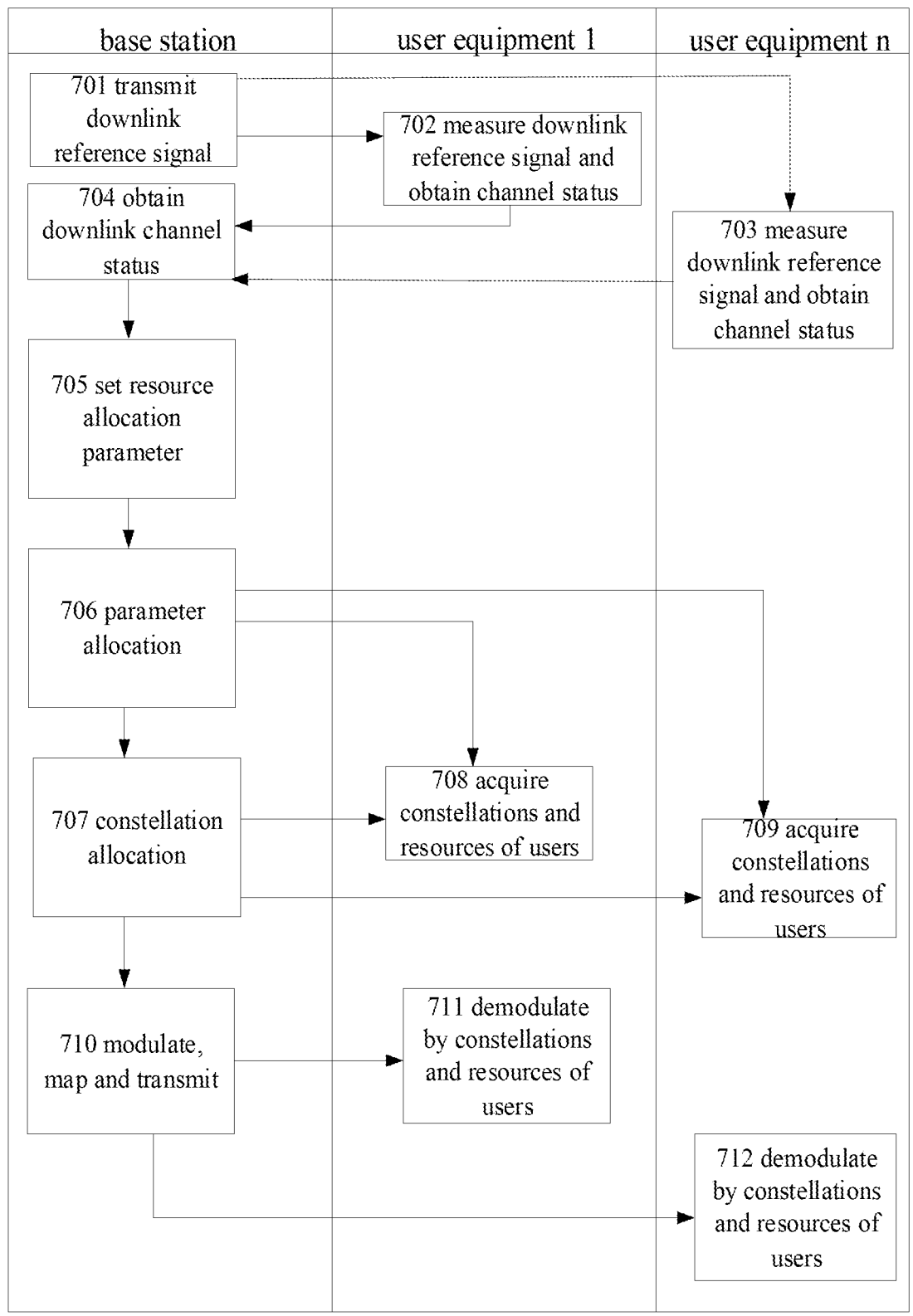
FIG. 7 is a schematic diagram of a Frequency Division Duplex (FDD) downlink communication method in accordance with an embodiment of the present application.

FIG. 7 is the schematic diagram of FDD downlink communication method between the base station and the user equipment in accordance with the embodiment of the present application. FDD is also an example merely herein, and not any limitation on the invention.

The difference between FIGS. 7 and 6 lies in blocks 701-704 for obtaining the downlink channel status, as the downlink channel status can not be obtained in a manner in which the base station measures the reference signal directly, due to the difference of the frequency at which the base station transmits the information to the user equipment from that at which the user equipment transmits the information to the base station in FDD downlink communication. In particular, the base station transmits downlink reference signals to the individual user equipments 1 to n in block 701. Next, the downlink reference signals are measured by the individual user equipments respectively in blocks 702 and 703, so as to derive the respective downlink channel statuses to be fed back to the base station. Next, the base station obtains the channel statuses of the individual downlink channels through the result of the feedback from the user equipments 1 to n in block 704. The subsequent blocks 705 to 712 are similar to blocks 604 to 611 of the procedure of TDD downlink communication in FIG. 6, and the description thereof is omitted accordingly.

3. A PROCEDURE OF SETTING ONE OR MORE RESOURCE ALLOCATING PARAMETERS IN ACCORDANCE WITH AN EMBODIMENT OF THE PRESENT APPLICATION

The one or more resource allocating parameters for non-orthogonal multiplex of the set of transmission resources are set based on the user specific information to apply to the sparse code multiple access of at least part of the plurality of user equipments in this section. That section corresponds to step S402 in FIG. 4, and is a specific description thereof.

3-1. A General Manner for Setting the Resource Allocating Parameters

The procedure of setting the resource allocating parameters in accordance with the embodiment of the present application is described in detail with reference to FIGS. 8A to 8D hereinbelow.

Figure 8A:
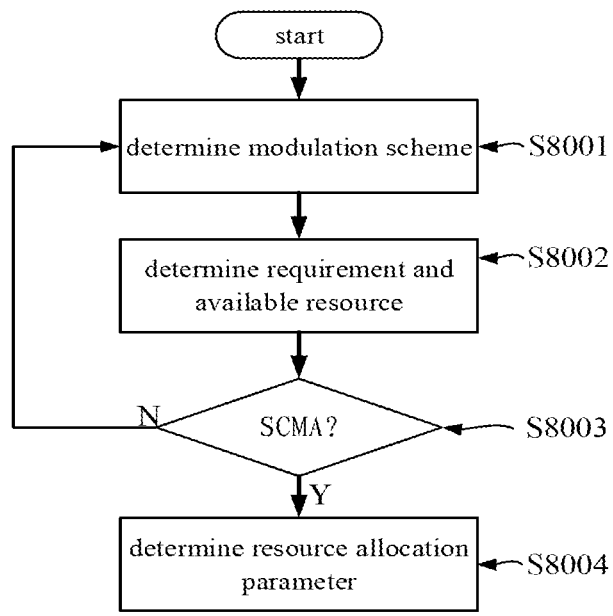
FIG. 8A is a flowchart for setting one or more resource allocating parameters in accordance with an embodiment of the present application.

FIG. 8A is a flowchart of setting the resource allocating parameters in accordance with the embodiment of the present application. The modulation scheme for the user equipment, including the number of the modulation points, may be determined in accordance with the correspondence of CQI included in the acquired channel statues to the modulation scheme in step S8001. As a preferred example, a modulation scheme corresponding to the channel with the worst CQI in the plurality of the user equipments may be determined to be the modulation scheme for all the user equipments. The modulation scheme corresponding to the CQI of the user equipments UE2 to UE4 is QPSK, therefore QPSK is selected to be the modulation scheme for the SCMA of the four user equipments UE1 to UE4, as shown in FIG. 9A.

The number of the user equipments which will participate in the SCMA is determined in accordance with, for example, the requests transferred by the user equipments in step S8002. In addition, the number of the available resources in the set of transmission resources is also determined.

It is decided whether the SCMA is required to be performed in step S8003. In particular, if the actual number of the resources derived based on the number of the user equipments and the modulation scheme is greater than the number K of the available resources, the SCMA is required to be performed in order to improve the utilization efficiency of the resources, and the mothed proceeds to step S8004. Otherwise, the SCMA is not required to be performed, and the method returns to the step S8001, since the number of the available resources is sufficient, such that the orthogonal multiple access is guaranteed to provide an optimized quality of the communication.

In the case where the SCMA is required to be performed, the resource allocating parameters for the SCMA of these user equipments are determined in step S8004, such that the number of the user equipments occupying the same resource is minimized. The resource allocating parameters are associated, for example, with the mapping matrix for the SCMA, indicating the resources out of the set of transmission resources occupied by the user equipment, where the number of the resource occupied by the user equipment is associated with the channel status. FIG. 8C illustrates the example for the mapping matrix V (the leftmost side) of one user equipment and an application thereof. The row of the mapping matrix V represents that the number of the available resources is K=4 and column thereof represents that the dimension of the modulation scheme is N=2, and the non-zero elements therein represent that the 1st and 3rd transmission resources are occupied by the user equipment. X1 and X2 are the modulated, e.g., QPSK modulated, N-dimensional, two-dimensional in the example, of codes of the binary symbols from which a K-dimensional, four-dimensional in the example, codeword is obtained after being mapped by the mapping matrix, as shown in the matrix in the right side.

The resource allocating parameters may also be a variant of the mapping matrix for the SCMA. For example, it may be the binary indicator vector f=diag($VV^T$), such that the resource out of the set of transmission resources occupied by the user equipment is represented with a more intuitional way.

As a more preferred variant, the resource allocating parameters are, for example, a factor graph matrix F=($f_1$, . . . , $f_J$) of which the column is constituted by the binary indicator vectors fj for the plurality, e.g., J, of user equipments and the individual rows represent the available resources, with j≤J. This will be clearer from the description with reference to FIGS. 8B and 8D hereinbelow. The advantage of the factor graph matrix is that it is allowed that the interference condition resulting from the manner in which the resources are allocated are derived intuitionally, to facillitate the resource allocation on the specific number of the user equipments in accordance with the optimization target.

Preferably, the determination of the resource allocating, parameters for the SCMA of these user equipments in step S8004 enables a maximization of the difference between the mapping matrices/binary indicator vectors of the different user equipments. An optimization problem below is required to be solved to satisfy the above conditions:

$$\min \quad \max \sum_{j=1}^{J} F_{kj} - \lambda \cdot \min_{\substack{i \neq j \\ i,j \in \{1,2,\ldots,J\}}} \left\{ \sum_{k=1}^{K} |F_{ki} - F_{kj}| \right\} \quad (1)$$

$$\text{s.t.} \quad \sum_{k=1}^{K} F_{kj} = N, \qquad j = 1, 2, \ldots, J,$$

$$\sum_{k=1}^{K} |F_{ki} - F_{kj}| > 0, \qquad \forall\, i \neq j,\, i, j \in \{1, 2, \ldots, J\},$$

where λ>0 represents a Lagrange multiplier, $F_{kj}$ is an optimization variable, and s.t. represents a constraint condition. A heuristic algorithm as shown in FIG. 8B is employed to solve the above optimization problem.

Figure 8B:
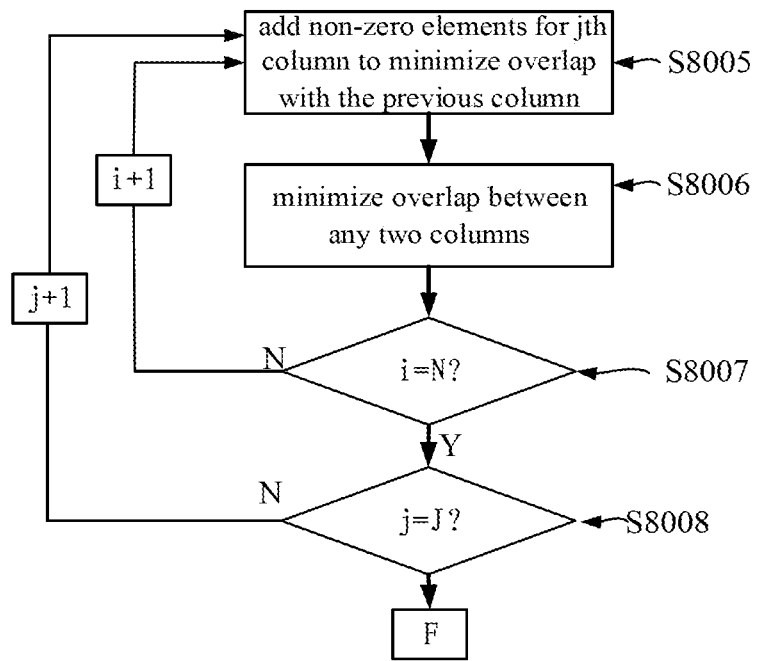
FIG. 8B is a flowchart for setting a factor graph matrix of a mapping matrix in accordance with an embodiment of the present application.

FIG. 8B is a flowchart of the determination of the factor graph matrix of the mapping matrix in accordance with the embodiment of the present application. A new column is added at a time in step S8005, and a number of the non-zero elements in each column is equal to the dimension N of the modulation scheme, such that an overlap with the non-zero elements in the previous columns is minimized. This guarantees minimization of the number of the user equipments occupying the same resource.

Preferably, it is enabled that the overlap between the non-zero elements of any two of the columns is minimized when a new column is added in step S8006, thereby guaranteeing the maximum difference between the mapping matrices of the different user equipments.

It is decided whether an addition of a new column is completed, that is, whether the number of the non-zero elements reaches N, in step S8007. If it is not completed, it returns to step S8005 to continue the addition of the next element in the column. Otherwise, it proceeds to step S8008.

It is decided whether a construction of F is completed, that is, whether the Jth column is completed, in step S8008. If it is not completed, it returns to step S8005 to continue the addition of the elements in the next column, until the construction of F is completed.

FIG. 8D is the exemplary schematic diagram of construction of the factor graph matrix F of the mapping matrix in accordance with the flowchart in FIG. 8B. In the example, it is assumed that the dimension of the modulation scheme determined in accordance with the channel status is N=3, the number of the constellation points is M=8, the number of the available resources is K=10, and the number of the user equipments is J=n. The addition of the columns corresponding to the user equipments UE1 to UE3 has already completed, and it can be seen that the addition of the non-zero elements enables that the same resource is only occupied by one user equipment.

Next, the corresponding columns, i.e., 3 non-zero elements "1"s and 7 zero elements, are added to the user equipment UE4. The first "1" is added to the 10th column, since the 10th resource has not been occupied by other users. The second "1" is added to the 1st row, since all of the previous 9 rows are occupied by 1 user equipment respectively, resulting in 1 overlap between the addition of "1" into any selected row and the "1" in the previous columns. The third "1" is added to the 4th row, since if it is added to the $2^{nd}$ to 3rd rows, there are two overlapped resources between the 1st and the 4th columns, in the case where the constraint condition in S8006 is further considered. Zeros are added to other elements in the 4th column after the addition of the third "1" is completed. All of then columns are added in this way, until the final factor graph matrix F is obtained.

Although the heuristic algorithm is employed to determine the resource allocating parameters in the embodiment in FIGS. 8B and 8D, the disclosure is not limited thereto. An exhaustion algorithm may also be employed in the case where the dimension N, the number of the available resources K are small. That is, all possible mapping matrices are traversed, and the differences between the number of the overlapped users of individual resource nodes and the mapping matrices of the individual users in each situation are compared, such that the set of mapping matrices with the minimum number of the overlapped users and the maximum difference of individual user mapping matrices are selected to be the optimal factor graph matrix F.

3-2. Other Embodiments of Setting the Resource Allocating Parameters

In the embodiment depicted with reference to FIG. 8A to 8D, in the case where it is required that the non-orthogonal resources and constellations are allocated to the plurality of user equipments with different channel statuses for transmission, the modulation scheme, including the number of the modulated points, for the user equipments are determined in accordance with the correspondence of the CQIs included in the acquired channel statuses to the modulation schemes, such that the resource allocating parameters are further set.

In one preferred embodiment, the modulation scheme corresponding to the channel with the worst CQI may be determined to be the modulation scheme for all the user equipments, as shown in FIG. 9A.

In another embodiment, these user equipments may be grouped in accordance with CQIs, such that the user equipments in each group have similar channel statuses or adapt to the same modulation scheme, for example, the users with CQIs 1 to 6 are adapted to QPSK and CQIs 7 to 9 are adapted to 16QAM. Each group of the user equipments is intended to be designed a mapping matrix and allocated a constellation, in order that the non-orthogonal resources are multiplexed for the user equipments within the group, and the orthogonal resources are used among groups. In the case where it is required that the resource blocks 1 to 6 are utilized by the user equipments 1 to 4 for transmission, the modulation schemes for the UE2 to UE4 are all 16QAM, as shown in FIG. 9B, thus the UE2 to UE4 are grouped into a group for the design of the factor graph matrix and the subsequent SCMA. The modulation scheme for UE1 is QPSK, and an orthogonal transmission may be performed separately instead of participation of the resource multiplex. In this way, the transmission quality of the SCMA and the utilization efficiency of the resources are able to be improved.

In one variant, in the case where a fixed set of mapping matrices, for example, $F_0$ in the following equation (2), is possible to be employed in the communication system, at most 6 user equipments are selected to participate in the multiplex of 4 resource blocks in accordance with the regulation of $F_0$. If the transmission is required by more than 6 user equipments simultaneously, the 6 user equipments with the most similar channel statuses/modulation schemes therein may be selected for the multiplex of the 4 resource blocks.

In another variant, in the case where the fixed set of mapping matrices, for example, $F_0$, is possible to be employed in the communication system, at most 6 users are selected to participate in the multiplex of the 4 resource blocks in accordance with the regulation of $F_0$. If the transmission is required by more than 6 user equipments simultaneously, the channel statuses of these plurality of user equipments may be sorted, for example, CQIs are sorted, and 6 user equipments with the best channel status therein are selected for the multiplex of the 4 resource blocks. The advantage of this variant embodiment is that since the bit error rate may be improved by the resource multiplex, this issue may be overcome to some extent by selecting the user equipments with better channels to participate in the multiplex. In other words, it is preferential that the user equipments with better channel conditions are selected for the SCMA.

4. A PROCEDURE OF ALLOCATION OF THE CONSTELLATIONS IN ACCORDANCE WITH AN EMBODIMENT OF THE PRESENT APPLICATION

In this section, each of the user equipments is allocated one constellation in accordance with the interference condition among a plurality of constellations, or the design and the allocation of the constellations may be considered from another perspective (a signal stratum). The section corresponds to step S405 in FIG. 4 and is the detailed description thereof.

4-1. An Embodiment of QPSK

Figure 10A:
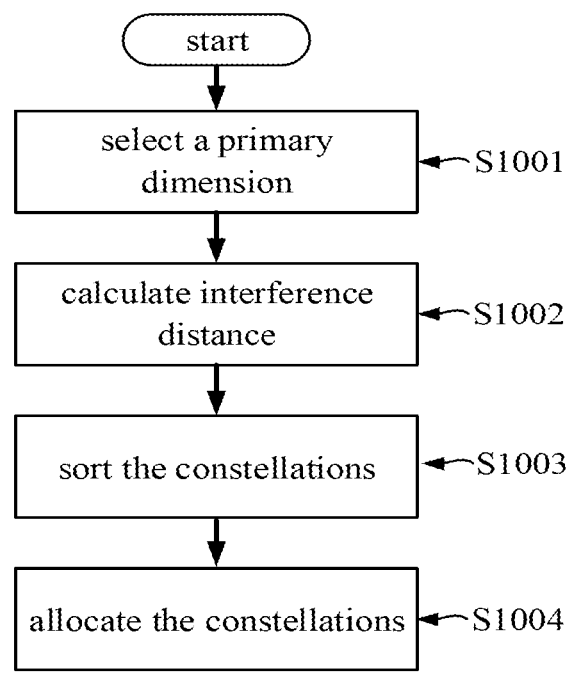
FIG. 10A is a flowchart for allocating a constellation in accordance with an embodiment of the present application.
Figure 10B:
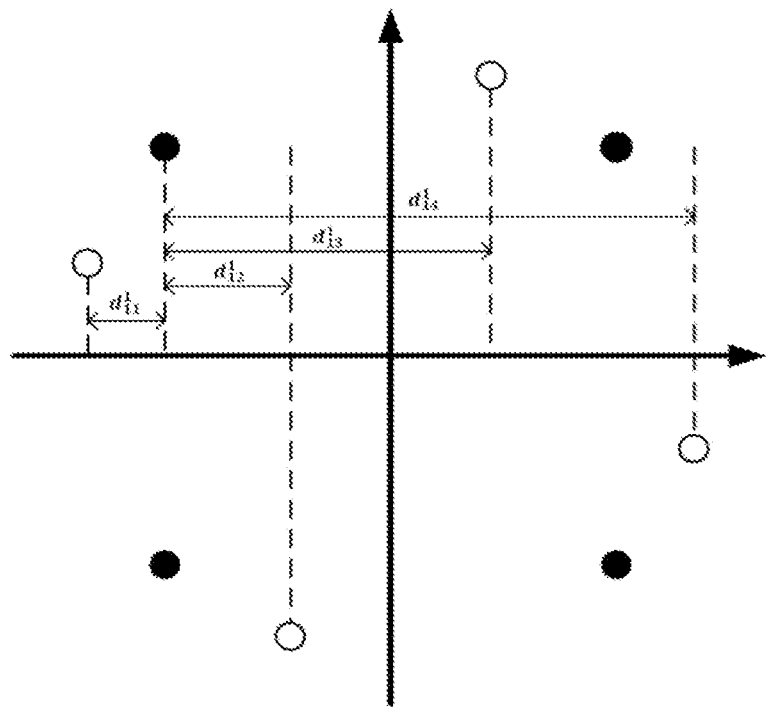
FIG. 10B is a schematic diagram for calculating an interference distance in accordance with an embodiment of the present application.

FIG. 10A is a flowchart of the allocation of the constellations in accordance with the embodiment of the present application. QPSK is taken as an example of the modulation scheme for illustration in the embodiment. A parent constellation and different operations of rotation thereof are employed in order to obtain different N-dimensional constellations, as shown in FIG. 10B, where the solid black dots are the parent constellation and the hollow circles are a constellation obtained by rotation of 30 degrees of the parent constellation. The plurality of constellations for the plurality of user equipments may be obtained through the such rotations.

A dimension with a maximum overlap of resources is selected to be a primary dimension in accordance with the known factor graph matrices in step S1001. Taking the factor graph matrix F* in the following equation (3) as an example: the first non-zero element in the individual columns is the 1st dimension, and it can be seen that there are 3 overlaps between these non-zero elements and other non-zero elements in the corresponding rows. Analogously, the 2nd dimension is consisted of the second non-zero elements in the individual columns, and the number of overlaps is 1. Therefore, the 1st dimension is selected to be the primary dimension n.

$$F_0 = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix} \quad (2)$$

$$F^* = \begin{bmatrix} 1 & 0 & 1 \\ 1 & 0 & 0 \\ 0 & 1 & 1 \\ 0 & 1 & 0 \end{bmatrix} \quad (3)$$

An interference distance Dn in the primary dimension between any two of the constellations is calculated in step S1002:

$$D_n = \sum_{i=1}^{M} p_{1i} \sum_{j=1}^{M} p_{2j} d_{ij}^n, n \in \{1, 2, \ldots, N\}, \quad (4)$$

where $p_1$, $p_2$ represents a probability with which there are M constellation points in two constellations, i.e., $\sum_{i=1}^{M} p_{1i}=1$, $\sum_{j=1}^{M} p_{2j}=1$. $d_{ij}^n$ represents a projection distance in the nth dimension between the ith constellation point of a first constellation and the jth constellation point of a second constellation. By this definition, it means that the shorter the interference distance is, the more severe the interference between the two constellations is.

FIG. 10B is a schematic diagram of calculation of the interference distance in accordance with the embodiment of the present application. In FIG. 10B, the black dots represent four points in the first constellation, and the circles represent the positions of the four points in the second constellation in the same coordinate system. In accordance with the calculation equation of the interference distance, the projection distance in the first dimension between one point in the first constellation and all points in the second constellation is given in this diagram, i.e., $d_{1j}^1$, j={1,2,3,4}. Analogously, individual projection distances may be substituted into equation (4) to derive the interference distance between two constellations.

The above interference distances are sorted in a descending order in step S1003, as shown in the 2nd row in FIG. 10C.

Each of the user equipments is allocated one constellation in step S1004. Preferably, one sorting of constellations is selected in accordance with the priority of the user equipments such that the constellation with long interference distance is allocated to the user equipment with a requirement of high priority. Alternatively, one sorting of constellations is selected in accordance with the overall performance requirement of the system such that the occupancy of the available resource of the set of transmission resources by different user equipments can obtain the best overall performance requirement.

More preferably, one sorting of constellations is selected such that the constellations with less interference (a long interference distance) corresponded to the binary indicator vectors with less overlap in the factor graph matrix.

Taking one sparse code multiple access system as an example, J user equipments transmit information to the base station through K orthogonal resources, with an assumption that the channel is an Additive Gauss Whit Noise one, and the system parameters are defined as follows: N=2, K=4, J=3, M=4 The mapping matrix in equation (3) may be derived in accordance with the design scheme of the factor graph matrix proposed in the present application.

It is assumed that three different QPSK constellations obtained by rotations as shown in FIG. 10B are employed, and the interference distance between the individual constellations is calculated by selecting the first dimension of F* as the primary dimension. The result thereof is shown in FIG. 10C It can be known that the interference distance between the constellations 1 and 2 or 1 and 3 is the longest, whereas the first two columns of the mapping matrix have the minimum overlap, so the constellations 1 and 2 or 1 and 3 are to be allocated to the first two columns correspondingly, thereby the sorting of the constellations as shown in FIG. 10C may be given. By doing so, the utilization efficiency of the resources and the performance of bit error rate of the system may be improved.

4-2. Other Embodiments of Calculation of the Interference Distance

The usage of an average projection distance between the constellations as the interference distance when the constellations are allocated is merely one embodiment for defining the interference condition between the individual constellations. The interference condition between the constellations may also be quantified by selecting other ways.

In one embodiment, instead of the projection distance and the selection of the primary dimension, an average Euclidean distance between the constellation points in two constellations is used as the interference distance to measure the interference condition between the constellations, and it means that the shorter the distance is, the more severe the interference is.

In another embodiment, an on-site measurement method is employed, and in a simulated wireless communication scenario, different constellation modulations are employed by two user equipments respectively, the interference condition between the constellations is expressed by the performance of bit error rate, and the like, measured on-site. A good performance of bit error rate means a less severe interference between the constellations. A quantitative result of the interference condition between the individual constellations may be obtained by using this method.

4-3. Other Embodiments

While QPSK is taken as an example for illustration, the disclosure is apparently not limited thereto, and may be applied to a variety of modulation schemes.

In one embodiment, in the case where 16QAM is employed, the schematic diagram of rotation of the constellation is shown in FIG. 10D. The remaining procedures of allocation are similar to the procedure of QPSK, and the repeated description thereof is omitted accordingly.

The result of allocation of the constellations is informed of the user equipments through a downlink signalling, as depicted above with reference to FIGS. 4 to 7. In another embodiment, the user equipments are informed of the parent constellation and the rotation angles through the downlink signalling upon the first allocation. Then if the parent constellation is not changed, only the rotation angles are needed to be transmitted in the case where the constellations are re-allocated. The advantage of the operation is that the interaction of signalling is able to be reduced.

In the previous embodiments, the constellations are allocated on the basis that the design of the mapping matrix has been completed. In another embodiment, the constellations may also be allocated separately based on any known mapping matrices. For example, in an SCMA system with N=2, K=4, J=3, M=4, a factor graph matrix formed by selection of any 3 columns for 3 user equipments from the existing $F_0$ in equation (2) is employed:

$$F = \begin{bmatrix} 1 & 0 & 0 \\ 0 & 1 & 0 \\ 0 & 0 & 1 \\ 1 & 1 & 1 \end{bmatrix}. \quad (5)$$

The remaining steps of allocation of the constellations are similar to those as mentioned above. The repeated description thereof is omitted accordingly.

4-4. Alternative Embodiment

In one alternative embodiment of the present application, the individual constellations are not allocated to the user by employing an operation by which the predetermined parent constellation is rotated and considering the interference condition therebetween, and the design and allocation of the constellations are considered from another perspective (a signal stratum) instead. In particular, the constellations are determined or calculated in accordance with the binary indicator vectors of the plurality of mapping matrix and the modulation scheme, such that the distance between the individual transmitted signals after the sparse code multiple access is maximized. For the receiving end, the user detection is that the specific transmitted signals are detected in accordance with the received individual transmitted signals with noises after the sparse code multiple access, so the performance of bit error rate of the receiving end is determined by the distance between the individual transmitted signals. The longer the distance is, the lower the bit error rate is and the better the performance of bit error is at the receiving end. The method for determining the constellations may be performed, for example, as follows.

The allocated mapping matrix is $[V_j^*]_{j=1}^J$. For the N-dimensional constellation with M points, the constellation of the jth user equipment may represent the following variables:

$$C_j = \begin{bmatrix} x_{11}^j & x_{12}^j & \cdots & x_{1M}^j \\ \vdots & \vdots & \vdots & \vdots \\ x_{N1}^j & x_{N2}^j & \cdots & x_{NM}^j \end{bmatrix},$$

The constellations of all J user equipments may be written as a matrix form, i.e., $C=[C_1, C_2, \ldots, C_J]_{N\times(MJ)}$. During each transmission, one symbol is selected by each of the user equipments from the its own constellation, and subjected to a sparsing mapping of the mapping matrix, in order to derive a sparse symbol to be transmitted which can be represented as follows:

$$V_j C_j = [V_j c_j^1, V_j c_j^2, \ldots, V_j c_j^M]_{K\times M}.$$

A signal to be transmitted at one time after the sparse code multiple access may be derived by addition of the sparse symbols transmitted by each user equipment, which is represented as follows:

$$\sum_{j=1}^{J} V_j c_j^{m_j}, m_j \in \{1, 2, \ldots, M\},$$

where $m_j$ represents an index of the symbol in the constellation of the jth user equipment, and a possible set of signals to be transmitted, representing as a matrix $\mathcal{S}$ in which each column $\mathcal{S}_i$ represents the signal which may be transmitted at one time, may be obtained when $m_j$ of all user equipments are traversed across all values. In order to design a constellation C so as to maximize the distance between the transmitted signals of respective times, an optimization problem is needed to be solved as follows:

$$\max \quad t^2$$
$$\text{s.t.} \|\mathcal{S}_i - \mathcal{S}_j\|_2^2 \geq t^2, \quad \forall i \neq j, i, j \in \{1, 2, \ldots, M^J\}$$
$$\frac{1}{M} Tr(C_j^H C_j) \leq P, \quad j = \{1, 2, \ldots, J\}$$

where t represents the minimum distance between all transmitted signals, Tr( ) represents a rank of the matrix, and $[\cdot]^H$ represents an operation of conjugation transposition. The first class of constraints of $\|\mathcal{S}_i - \mathcal{S}_j\|_2^2 \geq t^2$, $\forall i \neq j, i, j \in \{1, 2, \ldots, M^J\}$ enables the distance between the transmitted signals of respective times to be as long as possible, and the second class of constraints of $$\frac{1}{M} Tr(C_j^H C_j) \leq P, j = \{1, 2, \ldots, J\}$$

enables the average power of symbols of each constellation not to exceed a given power P. For a convenience of solution, an optimization variable is written to be a form of vector, that is, $$x = \begin{pmatrix} vec(C) \\ t \end{pmatrix}_{(NMj+1)\times 1},$$

where vec(·) represents the operation of the matrix vectorizing. It can be seen that both of the objective function and the constraint condition of the original optimization problem are quadratic forms of x, so the original problem may be written as an equivalent one as follows:

$$\min \quad x^H Q x$$
$$\text{s.t. } x^H A_i x \geq 0, \quad i \in \{1, 2, \ldots, C_{M^J}^2\}$$
$$x^H B_j x \leq MP, \quad j = \{1, 2, \ldots, J\}$$

Q, A, and B represent a coefficient matrix of corresponding quadratic forms. That problem is a non-convex quadratic constraint and quadratic programming one, which is a type of NP-hard problem and difficult to be solved even though the number of the constraints is less. It is to be noted that both of the objective function and the constraints of the above problem are a linear form of $xx^H$, and the above problem may be relaxed to be an approximation problem below by employing an idea of semi-definite relaxation (SDR) with X representing $xx^H$:

$$\min \quad Tr(QX)$$
$$\text{s.t. } Tr(A_i X) \leq 0, \quad i \in \{1, 2, \ldots, C_{M^J}^2\}$$
$$Tr(B_j X) \leq MP, \quad j = \{1, 2, \ldots, J\}$$

The relaxed problem is a semi-definite programming problem, and may be solved efficiently by employing a convex optimization toolkit CVX. However, an approximate solution $\tilde{x}$ of the equivalent problem is also needed to be extracted after the optimal solution X* is derived, which can be done by employing a Gauss Randomization algorithm as follows:

input: the optimal solution of the relaxed problem X*, the number of the randomization L.

---

For $\ell = 1, 2, \ldots, L$
  producing a random vector $\xi_\ell \sim \mathcal{CN}(0, X^*)$, and let
  $\hat{x}_\ell = \xi_\ell$ taking $\hat{x}_\ell (1+(j-1)NM; jNM) = \sqrt{\dfrac{MP}{\xi_\ell^H B_j \xi_\ell}} \cdot \xi_\ell (1+$ $(j-1)NM; jNM), j = 1, 2, \ldots, J$
  maximized distance $d_{max} = \max\limits_{i=1,2,\ldots,C_M^2 J} \sqrt{\xi_\ell'^H A_i' \xi_\ell'}$ $\hat{x}_\ell(JNM+1) = \max\{|\xi_\ell(n_x)|, d_{max}\}$,
    where, $\xi_\ell' = \xi_\ell(1:JNM)$, $A_i' = A_i(1:JNM, 1:JNM)$
End taking $\ell^* = \arg\min\limits_{\ell=1,2,\ldots,L} \hat{x}_\ell^H Q \hat{x}_\ell$ output: an approximate solution of the equivalent problem $\tilde{x} = \hat{x}_{\ell^*_o}$

---

Then, a solution of the original problem may be derived by a matrixing of the vectors, that is, an optimized constellation is as below:

$C^* = \text{unvec}(\tilde{x}(1:JNM))$ where unvec(·) represents a matrixing operation of the vector, and a correspondence of the elements in $C^*$ and $\tilde{x}$ is $C^*(i,j) = \tilde{x}(i+(j-1)N), i=1,2,\ldots,N, j=1,2,\ldots,MJ$ By solving the above optimization problem, J optimized constellations may be obtained, that is, the design of one constellation for each of the user equipments is completed. It can be seen, however, that the complexity of the above procedure for solving is still high. A complexity for solving the semi-definite programming problem being $O(m^4 \log 1/\epsilon)$, where $\epsilon$ represents a given accuracy of the solution, and $m = C_{M^2 1}$ represents the number of the constraints. The number of the constraints may be reduced to be $$m = \sum_{j=1}^{J} C_J^j \dfrac{(C_M^2 J)^j}{2} + J,$$

since there are many duplicate terms in the distance constraint in the original problem. However, it is still increased exponentially as the number, J, of the user equipments is increased. For further reducing the complexity, only a part of the constraints is considered, that is, the constellation points transmitted by only 1 or $$d_f = \left\lceil \dfrac{JN}{K} \right\rceil$$

numbers of the user equipments are different from each other during two transmissions, thereby the number of the constraints is reduced to be $$m = C_J^1 \dfrac{M(M-1)}{2} + C_J^{d_f} \dfrac{(C_M^2 f)^{d_f}}{2} + J,$$

which increases exponentially with $d_f$ rather than J. Therefore, the complexity of implementation may be reduced to a great extent when K>N.

It is worthy of being noted that it is merely a preferred example that t represents the minimum distance between all of the transmitted signals in the above optimization. In accordance with actual requirement of the application, t may represent an average distance, a median distance, or the last but one distance, etc., between all of the transmitted signals. Unlike the previous embodiments, the optimized constellation determined in accordance with the method of the above alternative embodiment is in one-to-one correspondence to the mapping matrix. The constellation is allocated to respective user equipment in accordance with some optimization target, while the same allocation is also performed on the mapping matrix. The remaining sections except for this one may also be understood with reference to the previous embodiments without affecting the implementation. In addition, it is to be noted that the design scheme of the constellation in accordance with the alternative embodiment may also independent from the optimized scheme of the mapping matrix/resource allocation in the previous embodiments, and respective constellation may be obtained by employ any, for example fixed, set of mapping matrices in conjunction with the alternative embodiment by a person skilled in the art. The repeated description thereof is omitted.

5. A SIMULATION OF THE SPARSE CODE MULTIPLE ACCESS SYSTEM IN ACCORDANCE WITH AN EMBODIMENT OF THE PRESENT APPLICATION

A following comparative experiment is performed in order to assess the performance of the SCMA system and the communication method above.

On the one hand, it is assumed that the factor graph matrix as in equation (3) and the result of constellation allocation in FIG. 10C are obtained by the scheme of the present application.

On the other hand, the existing design rules of the factor graph matrix are considered: a) the matrix is a K×J-dimensional matrix with respect to all user equipments, b) any two columns are different from each other, and c) the removing of the rows with all zeros therein in the individual mapping matrices corresponding thereto results in a unitary matrix. Therefore, any three different columns taken from the existing $F_0$ in equation (2) may all be used as a known matrix for 3 user equipments as shown in equation (5) (the comparative example 1).

Meanwhile, the constellation may be allocated to the user in a random order selected arbitrarily for comparison (the comparative example 2). The result of comparison is shown in FIGS. 11A to 11B and the condition of the simulation settings is given in Table 1.

TABLE 1 comparison of the settings of the experiment simulations

|  | mapping matrix | constellation |
| --- | --- | --- |
| comparative example 1 | F*_rand | random (G_rand) |
| comparative example 2 | F* | random |
| present application | F* | optimized (FIG. 10C) |

Figure 11B:
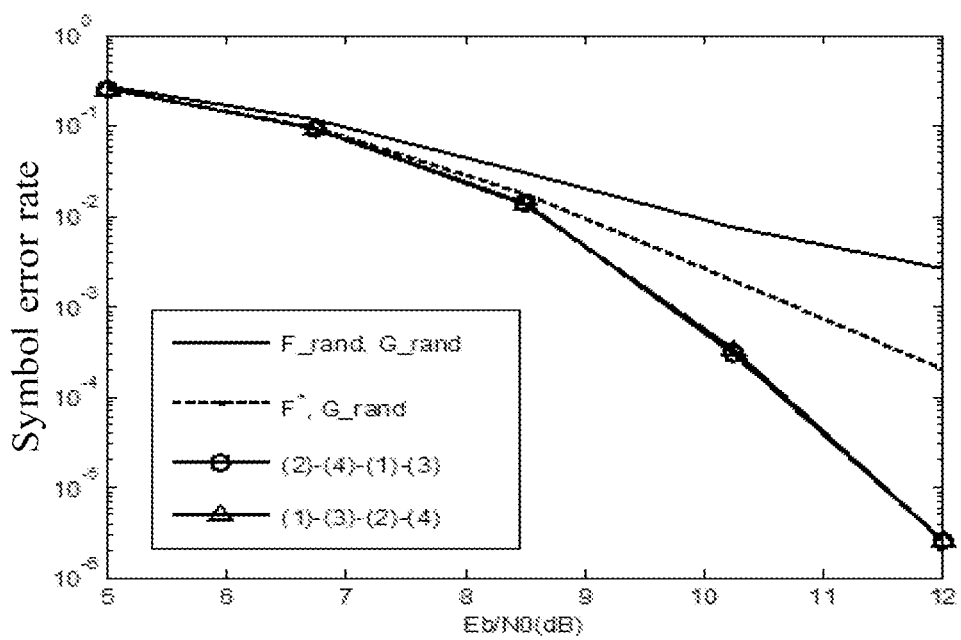
FIG. 11 is a simulation graph of an SCMA system in accordance with an embodiment of the present application and the prior art.

FIG. 11A is a graph in which the symbol error rate is varied with signal-to-noise ratio in the case where 3 user equipments are used, where three plots from the top to the bottom represent the comparative example 1, the comparative example 2, and the present application, respectively. FIG. 11B is a graph in which the symbol error rate is varied with signal-to-noise ratio in the case where 4 user equipments are used. It can be seen that a better performance of the bit error rate is achieved by using the factor graph matrix of the present application as compared with a randomly selected matrix, as shown in FIG. 11A. Furthermore, the best performance of the bit error rate is achieved by using the factor graph matrix and the scheme of the constellation allocation of the present application simultaneously.

For the case of 4 users, the same conclusion may be drew more apparently as well, as shown in FIG. 11B.

Furthermore, the embodiment in which the constellation is determined and allocated such that the distance between the transmitted signals is maximized as introduced in section 4-4 may be considered. In particular, the above comparative example 1, comparative example 2, the optimal solution of the constellation, and the approximate optimization scheme for solution with the reduced constraints for reducing the complexity of solving are considered. The condition of the simulation settings is seen in Table 2.

TABLE 2 comparison of the settings of the experiment simulations

| | mapping matrix | constellation |
|---|---|---|
| comparative example 1 | F*_rand | random |
| comparative example 2 | F* | random |
| approximate optimization method | F* | approximate optimized |
| optimization method | F* | optimized |

Figure 11C:
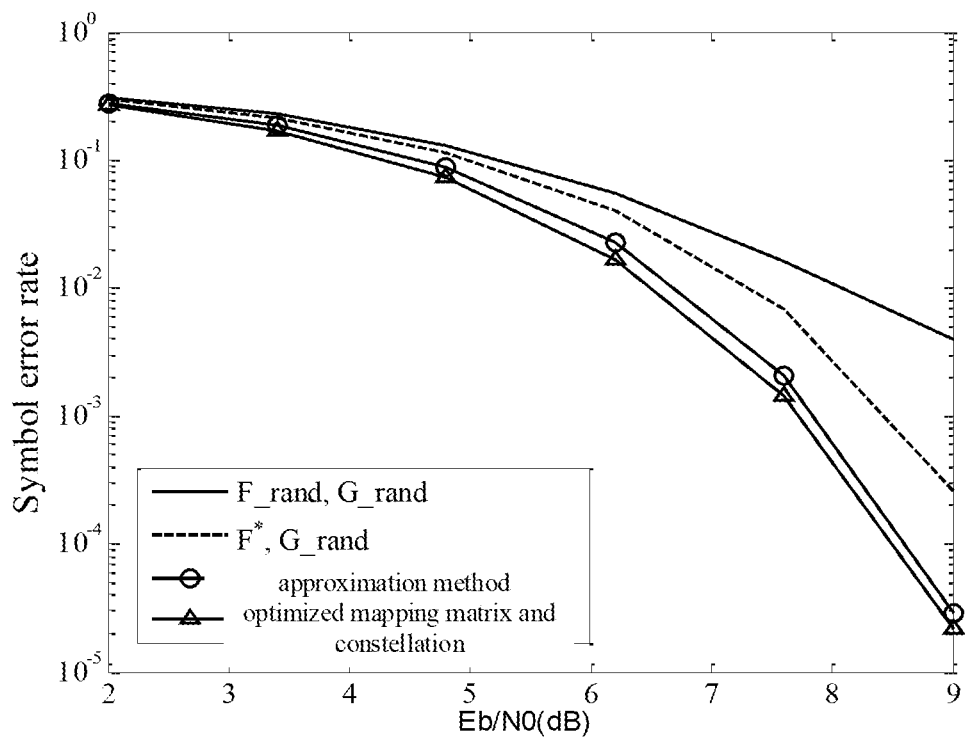

FIG. 11C illustrates the graph in which the symbol error rate is varied with signal-to-noise ratio, where four plots from the top to the bottom represent the bit error rates of the comparative example 1, the comparative example 2, the approximate optimization algorithm, and the optimization algorithm, respectively. It can be seen that the best performance of the bit error rate is achieved by the optimal solution of the constellation. In addition, the usage of the approximate optimization method with low complexity can guarantee a less loss of performance while the complexity of solving is reduced, that is, it is still better than the conventional design method.

6. APPLICATION EXAMPLE OF THE PRESENT APPLICATION

Technology according the present application is applicable to various products.

For example, the electronic device 300 on the user side may be realized as a mobile terminal such as a smartphone, a tablet personal computer (PC), a notebook PC, a portable game terminal, a portable/dongle type mobile router, and a digital camera apparatus, or an in-vehicle terminal such as a car navigation device. The electronic device 300 on the user side may also be realized as a terminal (that is also referred to as a machine type communication (MTC) terminal) that performs machine-to-machine (M2M) communication. Furthermore, the electronic device on the user side 300 may be a wireless communication module (such as an integrated circuit module including a single die) mounted on each of the above terminals.

For example, the electronic device 200 on the side of control device may be realized as any type of evolved Node B (eNB) such as a macro eNB, and a small eNB. A small eNB may be an eNB that covers a cell smaller than a macro cell, such as a pico eNB, micro eNB, and home (femto) eNB. Instead, the electronic device 200 on the side of control device may be realized as any other types of base stations such as a NodeB and a base transceiver station (BTS). The electronic device 200 on the side of control device may include a main body (that is also referred to as a base station device) configured to control wireless communication, and one or more remote radio heads (RRH) disposed in a different place from the main body.

6-1. Applications Related to Electronic Device on the Side of Control Device

First Application Example

Figure 12:
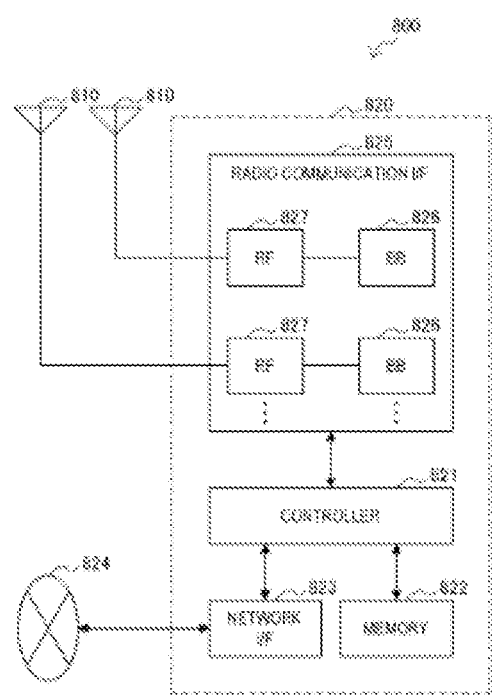
FIG. 12 is a block diagram of a first example of a schematic configuration of an electronic device on a side of a control device in accordance with an embodiment of the present application.

FIG. 12 is a block diagram illustrating a first example of a schematic configuration of an electronic device 200 on the side of control device to which a technology of the present application may be applied. The electronic device 200 is illustrated as an eNB 800. The eNB 800 includes one or more antennas 810 and a base station device 820. The base station device 820 and each antenna 810 may be connected with each other via a RF cable.

Each of the antennas 810 includes a single or multiple antenna elements (such as multiple antenna elements included in a Multiple Input and Multiple Output (MIMO) antenna), and is used for the base station 820 to transmit and receive radio signals. The eNB 800 may include multiple antennas 810, as illustrated in FIG. 12. For example, multiple antennas 810 may be compatible with multiple frequency bands used by the eNB 800. Although FIG. 12 illustrates the example in which the eNB 800 includes multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface such as an S1 interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 12. For example, the multiple BB processors 826 may be compatible with multiple frequency bands used by the eNB 800. The radio communication interface 825 may include the multiple RF circuits 827, as illustrated in FIG. 12. For example, the multiple RF circuits 827 may be compatible with multiple antenna elements. Although FIG. 12 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 12, one or more of the components (the acquiring unit 204 and the setting unit 205) included in the processing circuit 203 described with reference to FIG. 2 may be implemented in the radio communication interface 825. Alternatively, at least a part of these components may be implemented in the controller 821. As an example, the eNB 800 includes a part (for example, the BB processor 826) or the entire of the radio communication interface 825 and/or a module including the controller 821, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the eNB 800, and the radio communication interface 825 (for example, the BB processor 826) and/or the controller 821 may execute the program. As described above, as a device including the one or more components, the eNB 800, the base station device 820 or the module may be provided. In addition, a readable medium in which the program is recorded may be provided.

In addition, in the eNB 800 illustrated in FIG. 12, the communication unit 201 described with reference to FIG. 2 may be implemented in the radio communication interface 825 (for example, the RF circuit 827). In addition, the communication unit 120 may be implemented in the controller 821 and/or the network interface 823.

Second Application Example

Figure 13:
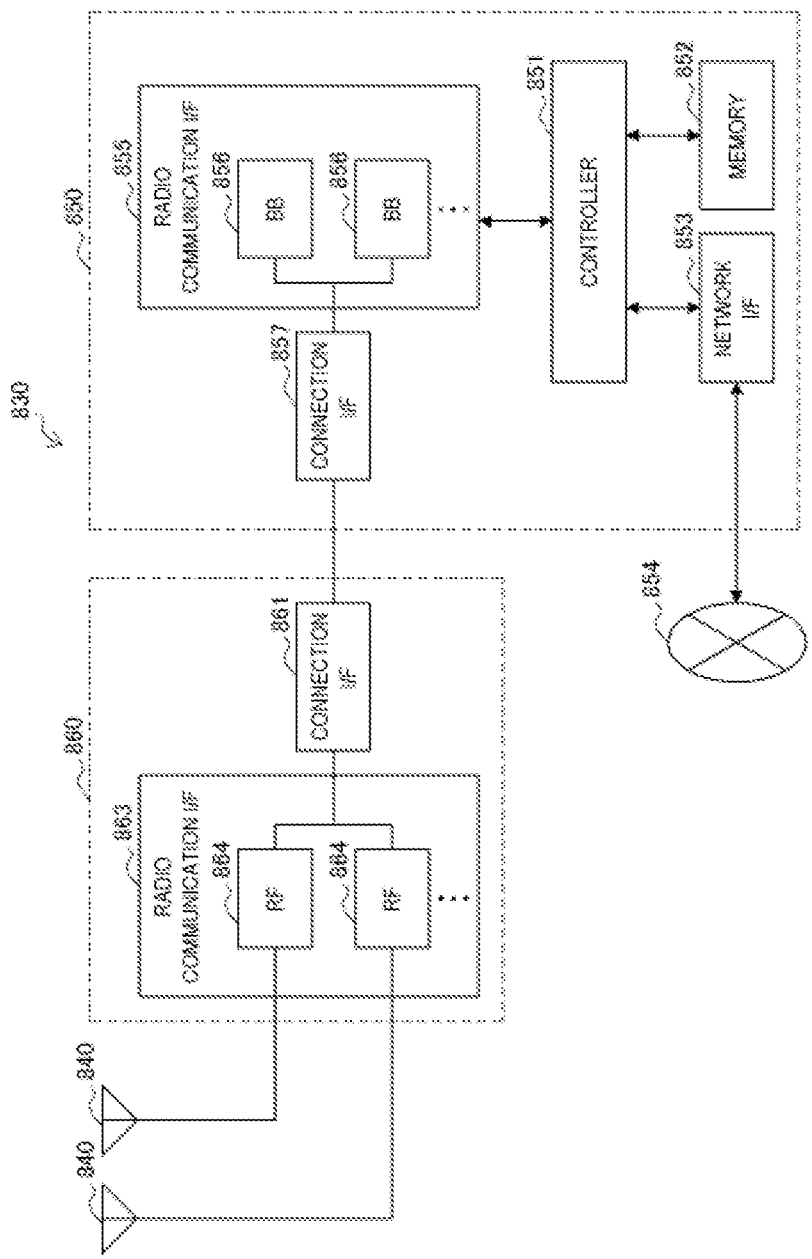
FIG. 13 is a block diagram of a second example of a schematic configuration of an electronic device on a side of a control device in accordance with an embodiment of the present application.

FIG. 13 is a block diagram illustrating a second example of a schematic configuration of an electronic device 200 on the side of control device to which a technology of the present application may be applied. In this Figure, the electronic device 200 is illustrated as eNB 830. The eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements such as multiple antenna elements included in an MIMO antenna, and is used for the RRH 860 to transmit and receive radio signals. The eNB 830 may include multiple antennas 840, as illustrated in FIG. 13. For example, multiple antennas 840 may be compatible with multiple frequency bands used by the eNB 830. Although FIG. 13 illustrates the example in which the eNB 830 includes multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 12.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 12, except the BB processor 856 is connected to the RF circuit 864 of the RRH 860 via the connection interface 857. The radio communication interface 855 may include the multiple BB processors 856, as illustrated in FIG. 12. For example, multiple BB processors 856 may be compatible with multiple frequency bands used by the eNB 830. Although FIG. 12 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 13. For example, multiple RF circuits 864 may support multiple antenna elements. Although FIG. 13 illustrates the example in which the radio communication interface 863 includes the multiple RF circuits 864, the radio communication interface 863 may also include a single RF circuit 864.

In the eNB 830 illustrated in FIG. 13, one or more of the components (the acquiring unit 204 and the setting unit 205) of the processing circuit 203 described with reference to FIG. 2 may be implemented in the radio communication interface 855. Alternatively, at least a part of these components may be implemented in the controller 851. As an example, the eNB 830 include a part (for example, the BB processor 856) or the entire of the radio communication interface 855 and/or a module including the controller 851, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the eNB 830, and the radio communication interface 855 (for example, the BB processor 856) and/or the controller 851 may execute the program. As described above, as a device including the one or more components, the eNB 830, the base station device 850 or the module may be provided. A program causing the processor to function as the one or more components may also be provided. In addition, a readable medium in which the program is recorded may be provided.

In addition, in the eNB 830 illustrated in FIG. 13, the communication unit 201 described with reference to FIG. 2 may be implemented in the radio communication interface 855 (for example, the BB circuit 856). In addition, the communication unit 120 may be implemented in the controller 851 and/or the network interface 853.

6-2. Applications Related to Electronic Device on the User Side

First Application Example

Figure 14:
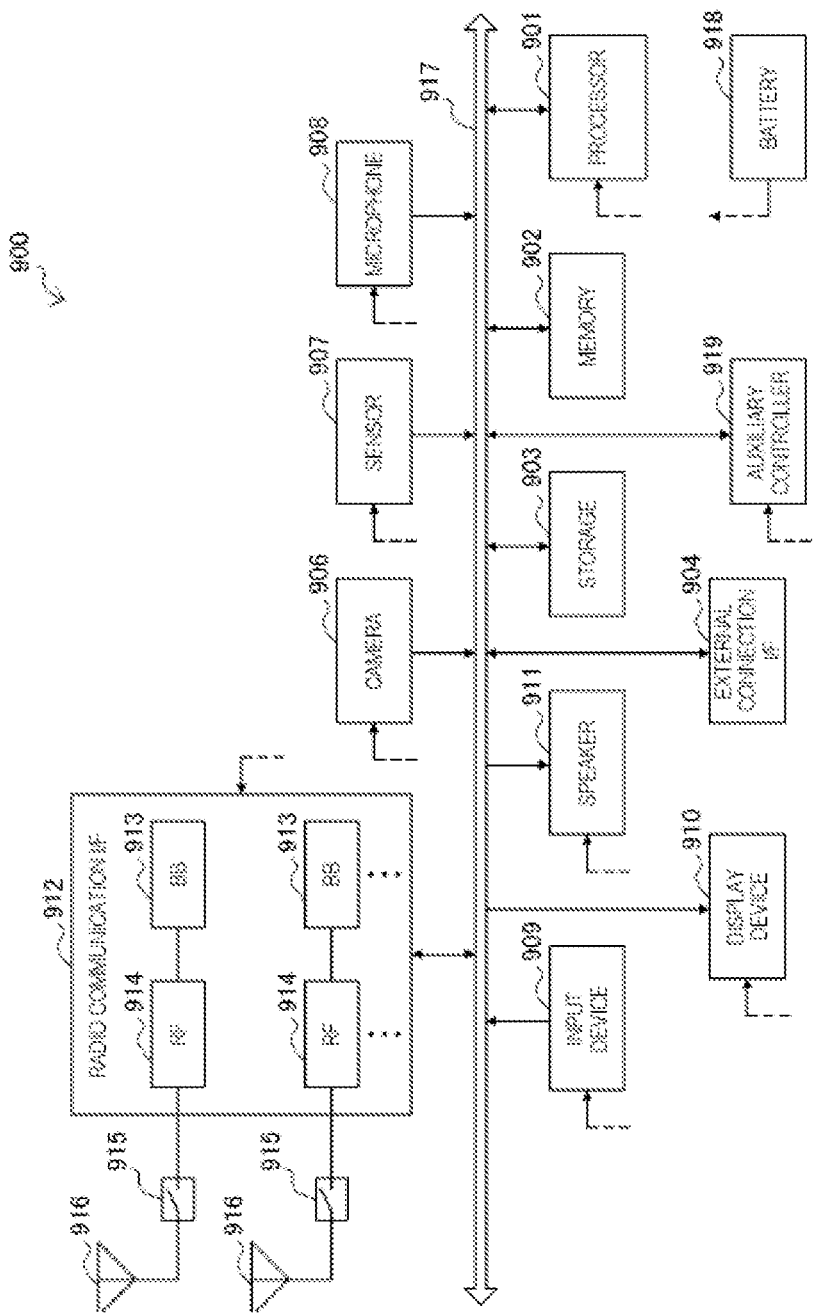
FIG. 14 is a block diagram of an example of a schematic configuration of a smartphone in accordance with an embodiment of the present application.

FIG. 14 is a block diagram illustrating an example of a schematic configuration of a smartphone 900 to which a technology of the present application may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and the other layers of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that integrates the BB processor 913 and the RF circuit 914 thereon. The radio communication interface 912 may include multiple BB processors 913 and multiple RF circuits 914, as illustrated in FIG. 14. Although FIG. 14 illustrates the example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a wireless local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements such as multiple antenna elements included in an MIMO antenna, and is used for the radio communication interface 912 to transmit and receive radio signals. The smartphone 900 may include multiple antennas 916, as illustrated in FIG. 14. Although FIG. 14 illustrates the example in which the smartphone 900 includes multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 14 via feeder lines, which are partially shown as dashed lines in the figure. The auxiliary controller 919 operates a minimum necessary function of the smartphone 900, for example, in a sleep mode.

In the smartphone 900 illustrated in FIG. 14, one or more of the components comprised in the processing circuitry 110 (the providing unit 304, and/or the acquiring unit 305) described with reference to FIG. 3 may be implemented in the radio communication interface 912. Alternatively, at least a part of these components may also be implemented in the processor 901 or the auxiliary controller 919. As an example, the smartphone 900 include a part (for example, the BB processor 913) or the entire of the radio communication interface 912, and/or a module including the processor 901 and/or the auxiliary controller 919, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the smartphone 900, and the radio communication interface 912 (for example, the BB processor 913), the processor 901 and/or the auxiliary controller 919 may execute the program. As described above, as a device including the one or more components, the smartphone 900 or the module may be provided. A program causing the processor to function as the one or more components may also be provided. In addition, a readable medium in which the program is recorded may be provided.

In addition, in the smartphone 900 illustrated in FIG. 14, for example, the communication unit 301 described with reference to FIG. 3 may be implemented in the radio communication interface 912, for example, the RF circuit 914.

Second Application Example

Figure 15:
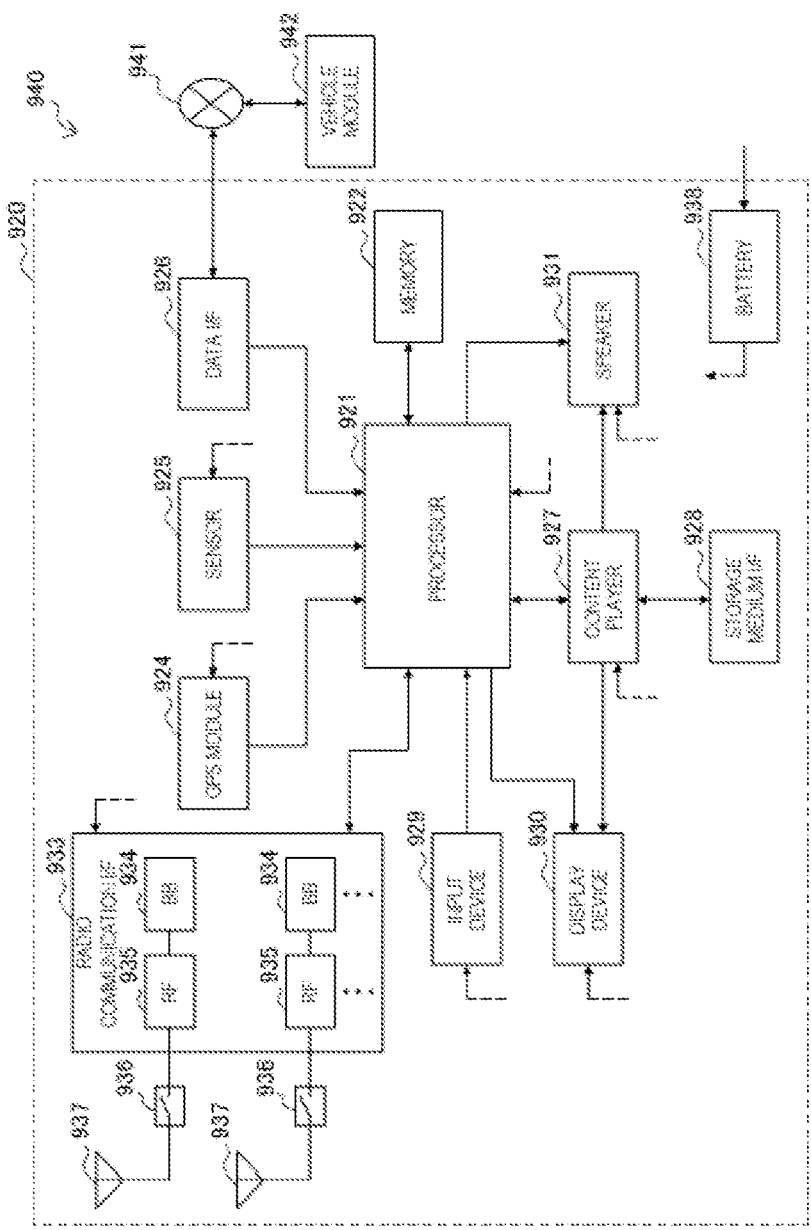
FIG. 15 is a block diagram of an example of a schematic configuration of an automobile navigation device in accordance with an embodiment of the present application.

FIG. 15 is a block diagram illustrating an example of a schematic configuration of a car navigation device 920 to which an embodiment of the technology of the present application may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores a program that is executed by the processor 921, and data.

The GPS module 924 uses GPS signals received from a GPS satellite to measure a position, such as latitude, longitude, and altitude, of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium, such as a CD and a DVD, that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme, such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module which integrates the BB processor 934 and the RF circuit 935 thereon. The radio communication interface 933 may include multiple BB processors 934 and multiple RF circuits 935, as illustrated in FIG. 15. Although FIG. 15 illustrates the example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a wireless LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements, such as multiple antenna elements included in an MIMO antenna, and is used for the radio communication interface 933 to transmit and receive radio signals. The car navigation device 920 may include the multiple antennas 937, as illustrated in FIG. 15. Although FIG. 15 illustrates the example in which the car navigation device 920 includes multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 15 via feeder lines that are partially shown as dashed lines in the figure. The battery 938 accumulates power supplied form the vehicle.

In the car navigation device 920 illustrated in FIG. 15, one or more of the components comprised in the processing circuitry 303 (the providing unit 304, and/or the acquiring unit 305) described with reference to FIG. 3 may be implemented in the radio communication interface 933. Alternatively, at least a part of these components may also be implemented in the processor 921. As an example, the car navigation device 920 includes a part (for example, the BB processor 934) or the entire of the radio communication interface 933 and/or a module including the processor 921, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the car navigation device 920, and the radio communication interface 933 (for example, the BB processor 934) and/or the processor 921 may execute the program. As described above, as a device including the one or more components, the car navigation device 920 or the module may be provided. A program causing the processor to function as the one or more components may also be provided. In addition, a readable medium in which the program is recorded may be provided.

In addition, in the car navigation device 920 illustrated in FIG. 15, for example, the communication unit 301 described with reference to FIG. 3 may be implemented in the radio communication interface 933, for example, the RF circuit 935.

Technology of the present application may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

7. CONCLUSION

It can be known according to the above description, it is proposed only a common criterion for the design of the mapping matrix when the maximum communication user equipments are supported in the prior art, whereas a novel design method by which the mapping matrix or the factor graph matrix is designed in accordance with the user specific information, in particular, the channel statuses for the specific number of the user equipments, is proposed in the present application, which can improve the design scheme of the codebook of the SCMA with respect to the common criterion in the prior art and the performance of bit error rate significantly.

Also, the information on the mapping matrix or the factor graph matrix designed as such may also be considered jointly when the constellation is allocated in the present application, which further improves the design scheme of the codebook of the SCMA and the performance of bit error rate significantly.

In addition, the differences between the user equipments may be considered in the present application. Although an example of the cellular communication system is described in the embodiments, the embodiments of the present application is not limited to the related example. For example, the communication system may be a system compliant with another telecommunication standard, such as a short range wireless communication scheme, a near field communication scheme, and a wireless LAN scheme. In that case, the individual electronic devices may be the corresponding terminal devices.

Although some of the specific embodiments have been described in detail, it should be appreciated by a person skilled in the art that the embodiments above are illustrative merely rather than any limitation on the scope of the present application. It should be understood by a person skilled in the art that the embodiments as described above can be modified without departing from the scope and spirit of the present application. The scope of the present application is defined by the appended claims.

What is claimed is:

1. An electronic device on a side of a control device in a wireless communication system, characterized in that it comprises a processing circuit configured to:
    acquire user specific information of a plurality of user equipments communicating with the electronic device, the user specific information including channel status of individual channels between the plurality of user equipments and the electronic device, and
    set resource allocating parameters used for non-orthogonal multiplex of a set of transmission resources based on the user specific information to apply to a sparse code multiple access of at least a part of the plurality of user equipments,
    wherein the resource allocating parameters comprise binary indicator vectors of a plurality of mapping matrices for the at least a part of the plurality of user equipments, and the processing circuit is further configured to acquire an optimizing target and to assign a binary indicator vector to each user equipment of the at least a part of the plurality of user equipments according to at least one optimizing target and interference condition among individual binary indicator vectors.

2. The electronic device according to claim 1, wherein the user specific information further includes at least one of priority of the plurality of user equipments and service types of the plurality of user equipments.

3. The electronic device according to claim 1, wherein the resource allocating parameters are associated with a mapping matrix for the sparse code multiple access and indicates the resources being occupied in the set of transmission resources by the at least a part of the plurality of user equipments, wherein the number of the resources being occupied by a user equipment is related to the channel status.

4. The electronic device according to claim 3, wherein the mapping matrix comprises non-zero values of low density such that data of respective user equipments can be detected on the multiplexed resources according to a message passing algorithm MPA.

5. The electronic device according to claim 3, wherein the processing circuit is further configured to use a heuristic algorithm to set the resource allocating parameters for the at least a part of the plurality of user equipments such that the number of user equipments occupying the same resource is minimum.

6. The electronic device according to claim 1, wherein the processing circuit is further configured to allocate a constellation to each user equipment of the at least a part of the plurality of user equipments according to at least one optimizing target and interference condition among a plurality of constellations determined based on a modulation scheme.

7. The electronic device according to claim 6, wherein the constellation and the resources are assigned by using the same optimizing target.

8. The electronic device according to claim 7, wherein the optimizing target comprises one of the priority of a user equipment and an overall system performance requirement.

9. The electronic device according to claim 6, wherein the processing circuit is further configured to determine the constellation according to the binary indicator vectors of the plurality of mapping matrices and the modulation scheme, such that a distance between the individual transmitted signals after the sparse code multi access is maximized.

10. The electronic device according to claim 8, wherein the processing circuit is further configured to allocate a constellation with lower interference condition and resources with lower interference condition to a user equipment with higher priority.

11. The electronic device according to claim 6, wherein the interference condition among the plurality of constellations is represented by an interference distance or measured physically for specific number of user equipments.

12. An electronic device on a side of a user equipment in a wireless communication system, characterized in that it comprises a processing circuit configured to:
provide user specific information of the user equipment to a control device, the user specific information including channel status of a channel between the user equipment and the control device, and
acquire resource allocating parameters used for non-orthogonal multiplex of a set of transmission resources by the user equipment and other user equipments from the control device to apply to a sparse code multiple access of the user equipment,
wherein the resource allocating parameters are set based on the user specific information of the user equipment and other user equipments,
wherein the resource allocating parameters comprise binary indicator vectors of a plurality of mapping matrices for the user equipment and the other user equipments, and the processing circuit is further configured to acquire a binary indicator vector assigned to the user equipment according to at least one optimizing target and interference condition among individual binary indicator vectors.

13. The electronic device according to claim 12, wherein the processing circuit is further configured to acquire an indication of a constellation and a modulation scheme for the sparse code multiple access.

14. The electronic device according to claim 12, wherein the user specific information further includes at least one of priority of the user equipment and service type of the user equipment.

15. The electronic device according to claim 13, wherein the resource allocating parameters are associated with a mapping matrix for the sparse code multiple access and indicates the resources being occupied in the set of transmission resources by said user equipment, wherein the number of resources being occupied by the user equipment is related to the channel status.

16. The electronic device according to claim 15, wherein the mapping matrix and the constellation are jointly determined and allocated to the user equipment based on the priority of the user equipment.

17. The electronic device according to claim 13, wherein the constellation is determined according to one or more binary indicator vectors of the mapping matrices and the modulation scheme for the sparse code multiple access, such that a distance between the individual transmitted signals after the sparse code multiple access is maximized.

18. A wireless communication method used in a wireless communication system comprising at least a control device and a plurality of user equipments, characterized in that it comprises:
acquiring by the control device, user specific information of a plurality of user equipments communicating with the control device, the user specific information including channel status of individual channels between the plurality of user equipments and the control device,
setting by the control device, resource allocating parameters used for non-orthogonal multiplex of a set of transmission resources based on the user specific information to apply to a sparse code multiple access of at least a part of the plurality of user equipments, wherein the resource allocating parameters comprise binary indicator vectors of a plurality of mapping matrices for the at least a part of the plurality of user equipments,
acquiring by the control device, an optimizing target, and
assigning by the control device, binary indicator vectors to each user equipment of the at least a part of the plurality of user equipments according to at least one optimizing target and interference condition among individual binary indicator vectors.

19. A wireless communication method used in a wireless communication system comprising at least a control device and a plurality of user equipments, characterized in that it comprises:
providing by the plurality of user equipments, user specific information of the individual user equipments to the control device, the user specific information including channel status of a channel between the respective user equipment and the control device,
acquiring by the plurality of user equipments, resource allocating parameters used for non-orthogonal multiplex of a set of transmission resources by the respective user equipments from the control device to apply to a sparse code multiple access of the plurality of user equipments, wherein the resource allocating parameters are set based on the user specific information of the plurality of user equipments and comprise binary indicator vectors of a plurality of mapping matrices for the plurality of user equipments, and
acquiring by the plurality of user equipments, binary indicator vectors assigned to the plurality of user equipments according to at least one optimizing target and interference condition among individual binary indicator vectors.

* * * * *